United States Patent
Ishiguro

(10) Patent No.: US 8,970,860 B2
(45) Date of Patent: Mar. 3, 2015

(54) IMAGE PROCESSING DEVICE THAT DISPLAYS PROCESS SEQUENCE, DISPLAY DEVICE AND NON-TRANSITORY COMPUTER READABLE RECORDING MEDIUM

(71) Applicant: Konica Minolta, Inc., Chiyoda-ku (JP)

(72) Inventor: Kazuhiro Ishiguro, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 13/919,246

(22) Filed: Jun. 17, 2013

(65) Prior Publication Data
US 2013/0335766 A1  Dec. 19, 2013

(30) Foreign Application Priority Data
Jun. 18, 2012 (JP) ................................. 2012-136524

(51) Int. Cl.
*G06F 3/12* (2006.01)
*H04N 1/00* (2006.01)

(52) U.S. Cl.
CPC ....... *H04N 1/00477* (2013.01); *H04N 1/00408* (2013.01); *H04N 1/00411* (2013.01); *H04N 2201/0094* (2013.01)
USPC .......... 358/1.13; 715/200; 715/772; 715/838; 715/859

(58) Field of Classification Search
USPC ................................................. 358/1.1–3.29
See application file for complete search history.

(56) References Cited

U.S. PATENT DOCUMENTS

| 6,847,388 B2 * | 1/2005 | Anderson ...................... 715/854 |
| 2007/0216973 A1 | 9/2007 | Tagawa |

(Continued)

FOREIGN PATENT DOCUMENTS

| JP | 2000-215322 A | 8/2000 |
| JP | 2007-280369 A | 10/2007 |
| JP | 2008-191799 A | 8/2008 |
| JP | 2008-236539 A | 10/2008 |
| JP | 2009-230632 A | 10/2009 |
| JP | 2010-009243 A | 1/2010 |
| JP | 2012-090061 A | 5/2012 |

OTHER PUBLICATIONS

Office Action issued on Aug. 19, 2014, by the Japan Patent Office in corresponding Japanese Patent Application No. 2012-136524, and an English Translation of the Office Action. (5 pages).

*Primary Examiner* — Benny Q Tieu
*Assistant Examiner* — Marcellus Augustin
(74) *Attorney, Agent, or Firm* — Buchanan Ingersoll & Rooney PC

(57) ABSTRACT

An image processing device, comprises: a display part; a manipulation detecting part for detecting an operation; an image inputting part for inputting image data; an image processing part for performing various types of image processing sequentially in accordance with a processing process set in advance; a thumbnail image generating part for generating a thumbnail image one by one; an image outputting part for outputting an image based on the image data which is processed through all various types of the image processing; and a display controlling part for displaying a processing path of various types of the image processing on the display part, and for displaying the thumbnail image on the display part. The display controlling part updates the displayed processing path, thereby displaying a progress of the image processing to process the image data, and updates the thumbnail image in conjunction with the update of the displayed processing path.

19 Claims, 23 Drawing Sheets

(56) References Cited

U.S. PATENT DOCUMENTS

| | | |
|---|---|---|
| 2008/0186285 A1 | 8/2008 | Shimizu |
| 2008/0215046 A1* | 9/2008 | Messing et al. .................. 606/41 |
| 2008/0231914 A1 | 9/2008 | Motoyoshi |
| 2009/0323096 A1* | 12/2009 | Oshima ........................ 358/1.13 |
| 2012/0008176 A1* | 1/2012 | Ishida ........................... 358/474 |
| 2012/0096348 A1* | 4/2012 | Nagamine et al. ............. 715/273 |
| 2012/0288256 A1* | 11/2012 | Ikeda et al. ................... 386/241 |

* cited by examiner

IMAGE PROCESSING DEVICE THAT DISPLAYS PROCESS SEQUENCE, DISPLAY DEVICE AND NON-TRANSITORY COMPUTER READABLE RECORDING MEDIUM

This application is based on the application No. 2012-136524 filed in Japan, the contents of which are hereby incorporated by reference.

BACKGROUND OF THE INVENTION

1. Field of the Invention

The present invention relates to an image processing device, a display device and a non-transitory computer readable recording medium.

2. Description of the Background Art

Image processing devices such as MFPs are capable of editing image data generated by executing jobs after execution of the jobs. This known technique is introduced for example in Japanese Patent Application Laid-Open No. JP 2009-230632 A (hereafter, document 1) and Japanese Patent Application Laid-Open No. JP 2008-236539 A (hereafter, document 2).

It is assumed that there is a document including multiple pages, each of which having images printed on both sides, and a scan job for each side of the page of the document is executed. According to the known technique disclosed in document 1, after two scan jobs per one side page are executed, a group of odd pages and a group of even pages generated in response to two scan jobs are rearranged with a simple operation. As a result, a document file containing the image data of the first page to the last page in order of front to back is allowed to be created.

According to the known technique disclosed in document 2, a list of images generated by a scan job is displayed on an operational panel which is operable by a user by touching its screen after execution of the scan job, and an edit icon is displayed next to the list. When the user drags the image of the list to the edit icon, an edit processing corresponding to the edit icon to process the image selected by the user is started.

According to the known techniques disclosed in the respective documents 1 and 2, image data is processed or edited as intended by a user in response to edit operation by the user after execution of the scan job.

The above-described image processing device performs a variety of image processing including a background removal, a resolution conversion and a color conversion and generates image data to output during execution of a scan job, for example. The conventional image processing device does not allow a user to recognize how the image data changes in response to each image processing performed during execution of the job. One of reasons why the conventional image processing device does not allow the user to recognize how the image data changes is that the image processing is complete in a short time like few microseconds to few milliseconds when each image processing is performed by a hardware on the image processing device, for example. In general, the user checks the output image after execution of the job is totally complete, thereby recognizing whether or not the image as intended is output. If the image as intended is not output, the user is required to operate the operational panel to perform the edit processing on the output image separately from the image processing performed during execution of the job after execution of the job is complete as disclosed in the known technique in the aforementioned document 2, resulting in poor operation efficiency.

When the image as intended is not output by execution of the job, the user sometimes makes change in the settings of the image processing performed during execution of the job and gives an instruction on execution of the job to the image processing device again. For scan jobs, the user has to place again the document already read once on a scanner section and again give the instruction on the execution of the job, resulting in poor operation efficiency. Not only for the scan jobs, when the user tries to make change in the settings of the image processing performed during execution of the job, it is difficult for the user to see what settings of the processing of the variety of the image processing performed during execution of the job is required to be changed, resulting in poor operability.

SUMMARY OF THE INVENTION

The present invention is intended to solve the above problems. Thus, the present invention is intended to provide an image processing device, a display device and a non-transitory computer readable recording medium capable of allowing a user to easily check how image data changes in response to each image processing performed during execution of a job.

First, the present invention is directed to an image processing device.

According to an aspect of the image processing device, the image processing device, comprises: a display part on which a variety of information is displayed; a manipulation detecting part for detecting an operation on the display part; an image inputting part for inputting image data; a storage part for storing the image data input by the image inputting part; an image processing part for reading the image data stored in the storage part and performing various types of image processing sequentially in accordance with a processing process set in advance; a thumbnail image generating part for generating a thumbnail image one by one based on the image data input by the image inputting part or the processed image data generated sequentially in response to each type of the image processing performed by the image processing part; an image outputting part for outputting an image based on the image data which is processed through all various types of the image processing by the image processing part; and a display controlling part for displaying a processing path of various types of the image processing performed sequentially by the image processing part from the image data is input by the image inputting part until the image is output by the image outputting part on the display part, and for displaying the thumbnail image generated by the thumbnail image generating part on the display part. The display controlling part updates the displayed processing path, thereby displaying a progress of the image processing to process the image data, and updates the thumbnail image displayed on the display part in conjunction with the update of the displayed processing path.

Second, the present invention is directed to a display device capable of displaying in cooperation with an image processing device capable of performing a variety of image processing to process image data.

According to an aspect of the display device, the image processing device includes: an image inputting part for inputting the image data; a storage part for storing the image data input by the image inputting part; an image processing part for reading the image data stored in the storage part and performing various types of the image processing sequentially in accordance with a processing process set in advance; a thumbnail image generating part for generating a thumbnail image one by one based on the image data input by the image inputting part or the processed image data generated sequentially in response to each type of the image processing performed by the image processing part; an image outputting part for outputting an image based on the image data which is processed through the image processing by the image processing part; and a job controlling part for controlling the image processing performed by the image processing part and the processing to output the image performed by the image outputting part. The display device includes: a communication part for establishing communication with the image processing device; a display part on which a variety of information is displayed; a manipulation detecting part for detecting an operation on the display part; and a display controlling part for displaying a processing path of various types of the image processing performed sequentially by the image processing part from the image data is input by the image inputting part until the image is output by the image outputting part on the display part in accordance with information obtained from the job controlling part, and for obtaining the thumbnail image generated one by one by the thumbnail image generating part and displaying the obtained thumbnail image on the display part. The display controlling part updates the displayed processing path, thereby displaying a progress of the image processing to process the image data, and updates the thumbnail image displayed on the display part in conjunction with the update of the displayed processing path.

Third, the present invention is directed to a non-transitory computer readable recording medium on which a program is recorded. The program is executable on a display device including a display part on which a variety of information is displayed and capable of detecting an operation on the display part. The program is executed on the display device, thereby causing the display device to display in cooperation with an image processing device capable of performing a variety of image processing to process image data.

According to an aspect of the non-transitory computer readable recording medium, the image processing device includes: an image inputting part for inputting the image data; a storage part for storing the image data input by the image inputting part; an image processing part for reading the image data stored in the storage part and performing various types of the image processing sequentially in accordance with a processing process set in advance; a thumbnail image generating part for generating a thumbnail image one by one based on the image data input by the image inputting part or the processed image data generated sequentially in response to various types of the image processing performed by the image processing part; an image outputting part for outputting an image based on the image data which is processed through the image processing by the image processing part; and a job controlling part for controlling the image processing performed by the image processing part and the processing to output the image performed by the image outputting part. The program executed on the display device to function as a system comprises: a communication part for establishing communication with the image processing device; and a display controlling part for displaying a processing path of various types of the image processing performed sequentially by the image processing part from the image data is input by the image inputting part until the image is output by the image outputting part on the display part in accordance with information obtained from the job controlling part, and for obtaining the thumbnail image generated one by one by the thumbnail image generating part and displaying the obtained thumbnail image on the display part. The display controlling part updates the displayed processing path, thereby displaying a progress of the image processing to process the image data, and updates the thumbnail image displayed on the display part in conjunction with the update of the displayed processing path.

DESCRIPTION OF THE PRESENT PREFERRED EMBODIMENTS

Figure 1:
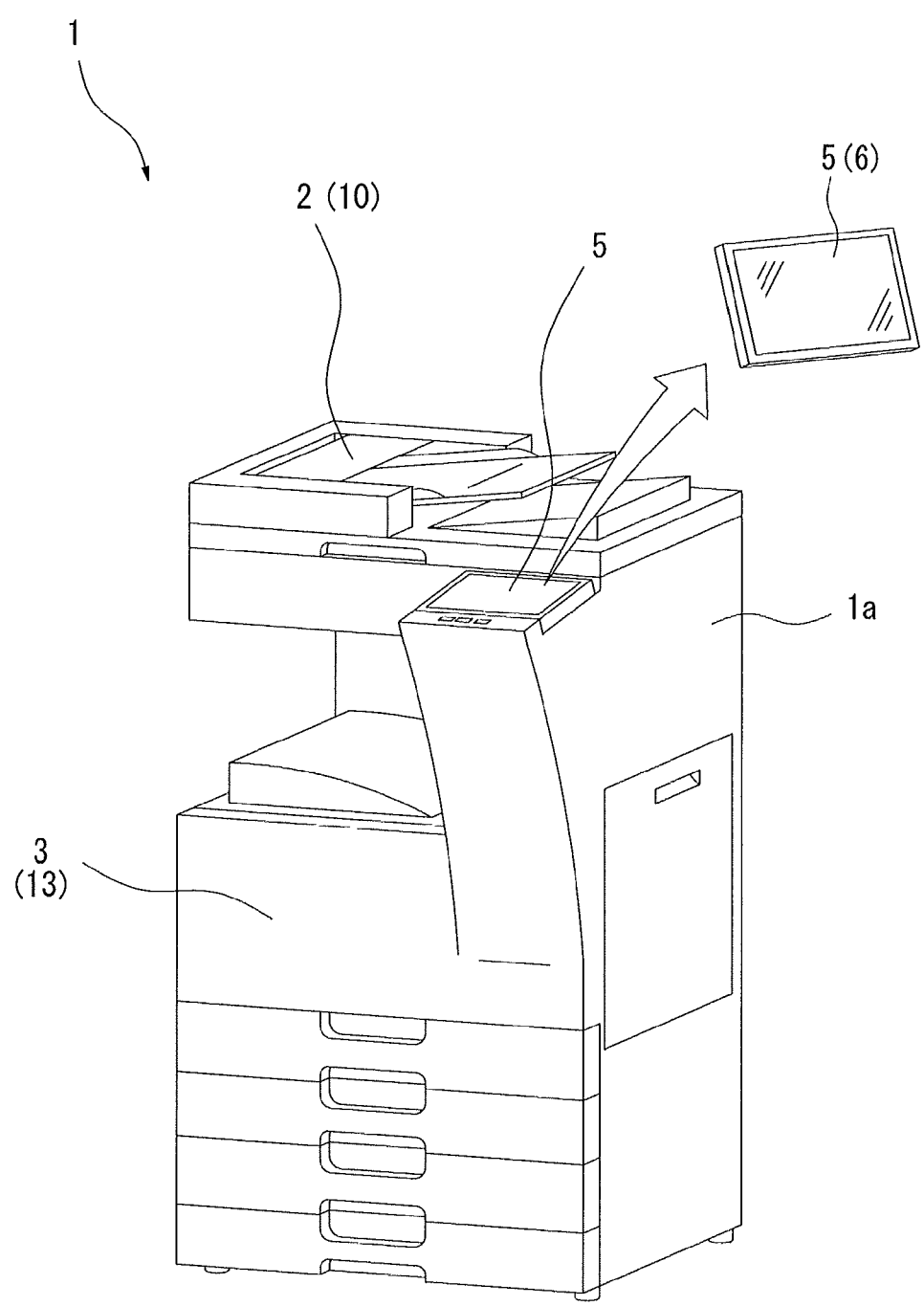
FIG. 1 shows an exemplary configuration of an image processing device.

Preferred embodiment of the present invention is described in detail below with reference to figures. In the description given below, those elements which are shared in common among figures are represented by the same reference numerals, and these elements are not discussed repeatedly for the same description.

FIG. 1 shows an exemplary configuration of an image processing device 1 of the present preferred embodiment. The image processing device 1 is formed from a device such as one of MFPs (Multi-functional peripherals) capable of executing a variety of jobs including copy jobs, print jobs, scan jobs and fax jobs.

A device body 1a of the image processing device 1 includes a scanner section 2 and a printer section 3. The scanner section 2 is driven to read a document and generate image data thereof. The printer section 3 is driven to produce a printed output by forming an image on a sheet such as a printing sheet. The device body 1a is provided with an operational panel 5, a user interface operable by a user in use of the image processing device 1, on its front side. The operational panel 5 can be attached and removed from the device body 1a. For using the operational panel 5 by removing from the device body 1a, the operational panel 5 serves as a portable display device 6 such as a tablet terminal. The operational panel 5 establishes wired or radio communication with the device body 1a, thereby displaying a variety of operation screen images and notifying the device body 1a of an operation by the user after detecting the operation.

Figure 2:
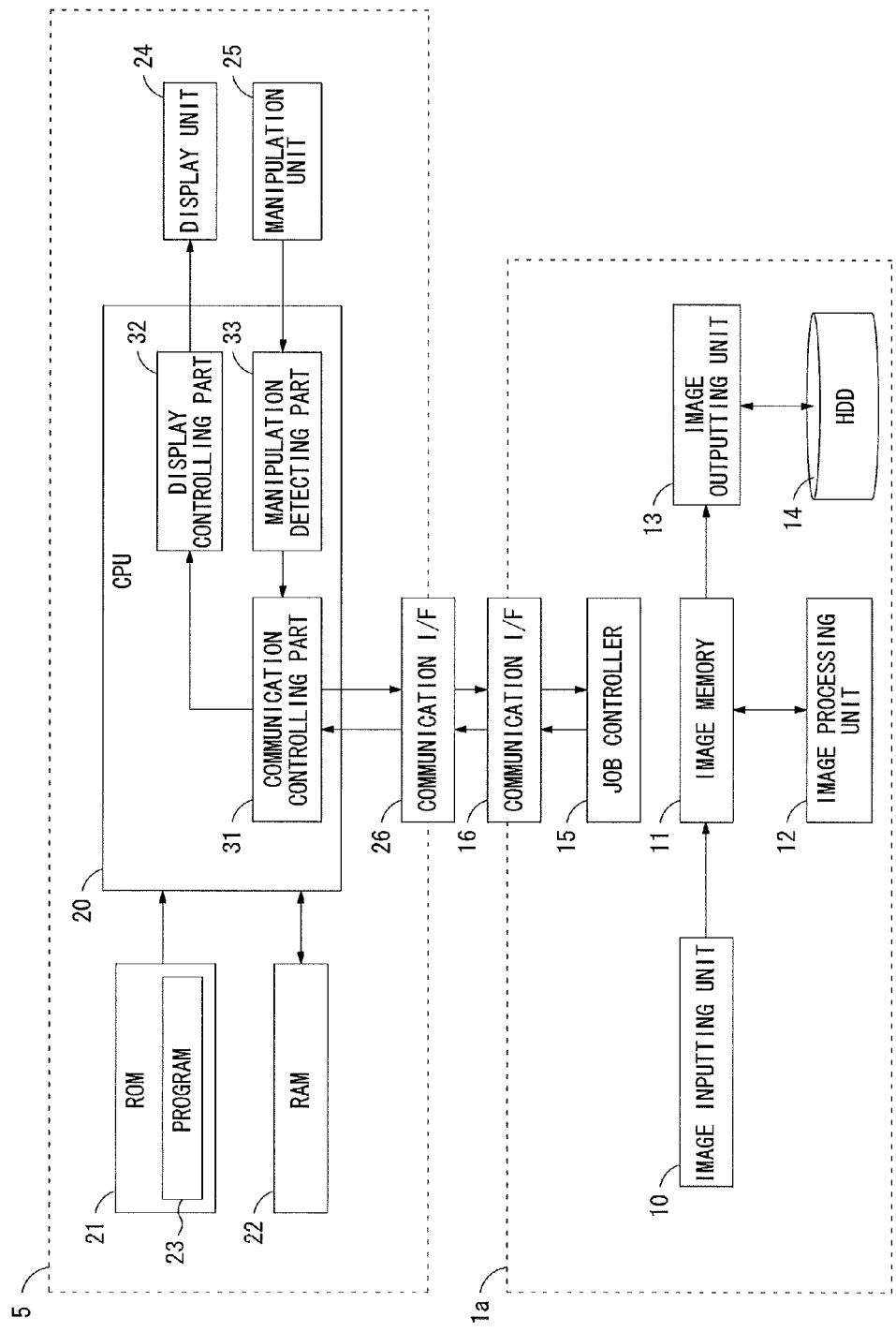
FIG. 2 is a block diagram showing an exemplary hardware configuration of the image processing device.

FIG. 2 is a block diagram showing an exemplary hardware configuration of the image processing device 1. As illustrated in FIG. 2, the device body 1a of the image processing device 1 includes an image inputting unit 10, an image memory 11, an image processing unit 12, an image outputting unit 13, a hard disk device 14, a job controller 15 and a communication interface 16. Each unit is brought into operation on the device body 1a so that the image processing device 1 is allowed to execute various types of jobs including copy jobs, print jobs, scan jobs and fax jobs. In response to receiving image data to be a target of execution of the job over a network, for example, the image processing device 1 executes the print job. When the user places a document on the scanner section 2 and gives an instruction on execution of a job by using the operational panel 5, the image processing device 1 executes the job such as the copy job, the scan job or the fax transmission job specified by the user.

Figure 3:
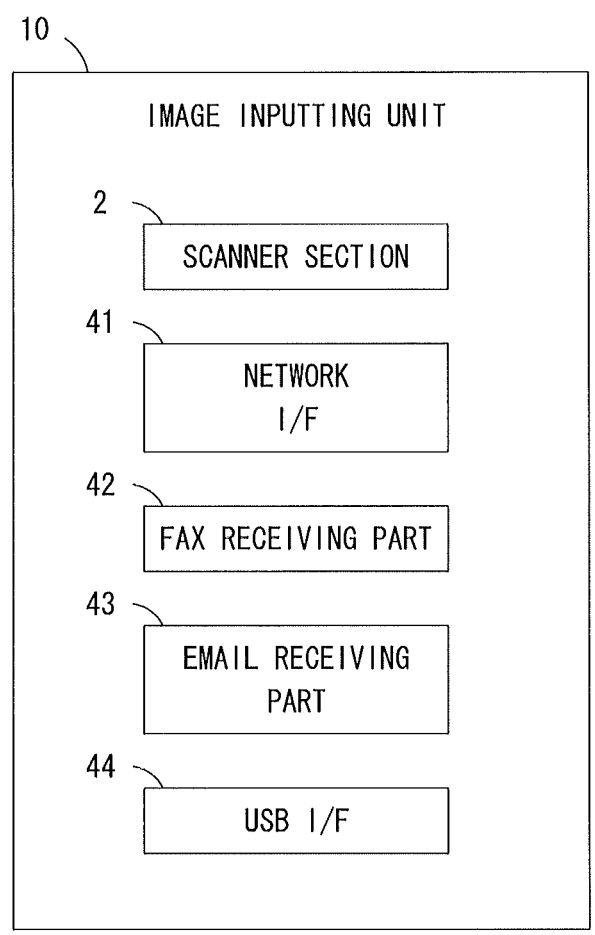
FIG. 3 is a block diagram showing an exemplary configuration of an image inputting unit.

The image inputting unit 10 inputs image data to be a target of execution of the job. The image inputting unit 10 includes the aforementioned scanner section 2. The image inputting unit 10 also includes a variety of structures that are capable of inputting the image data besides the scanner section 2. FIG. 3 is a block diagram showing an exemplary configuration of the image inputting unit 10. As illustrated in FIG. 3, the image inputting unit 10 includes the scanner section 2, a network interface 41, a fax receiving part 42, an email receiving part 43 and a USB interface 44. The scanner section 2 is brought into operation for executing the job, such as the copy job, the scan job or the fax transmission job, for instance, to generate the image data to be the target of execution of the job by reading the document as described above. The network interface 41 inputs the image data to be the target of execution of the print job, for instance, over the network such as LAN (Local Area Network). The fax receiving part 42 receives fax data over lines such as public phone lines, thereby obtaining the image data to output. The email receiving part 43 periodically accesses an email server connected to the network, and obtains an email as the image data to output if any email addressed to the image processing device 1 is saved in the email server. The USB interface 44 is an interface to which an external storage device such as a USB memory is connected. The USB interface 44 obtains the image data stored in the external storage device as the target of execution of the job. The image inputting unit 10 is also capable of obtaining the image data stored in the hard disk device 14, for example, as the target of execution of the job. In response to obtaining the image data to be the target of execution of the job after starting execution of the job, the image inputting unit 10 having the configuration of FIG. 3 stores the obtained image data in the image memory 11. The image data obtained by the image inputting unit 10 as the target of execution of the job may be the image data of a single page or the image data of multiple pages.

Figure 4:
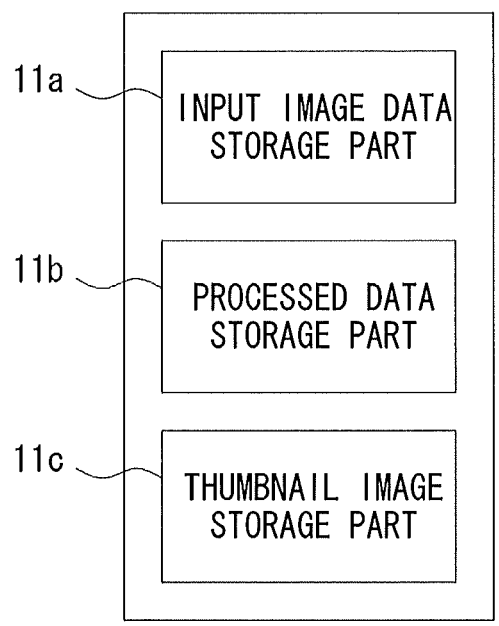
FIG. 4 is a block diagram showing an exemplary configuration of an image memory.

The image memory 11 includes a storage region in which the image data of multiple pages may be stored. FIG. 4 is a block diagram showing an exemplary configuration of the image memory 11. As shown in FIG. 4, the image memory 11 includes an input image data storage part 11a, a processed data storage part 11b and a thumbnail image storage part 11c. The image data obtained by the image inputting unit 10 is stored in the input image data storage part 11a. The image data stored in the input image data storing part 11a remains original data (initial data) until execution of the job is complete without being updated. The image data stored in the input image data storage part 11a may be hold as it is for a predetermined period of time after execution of the job is complete.

The image processing unit 12 sequentially reads the image data of the single page stored in the input image data storage part 11a of the image memory 11 and performs the image processing in accordance with a predetermined processing process. The image processing unit 12 is capable of sequentially performing multiple image processing in accordance with the predetermined processing process.

Figure 5:
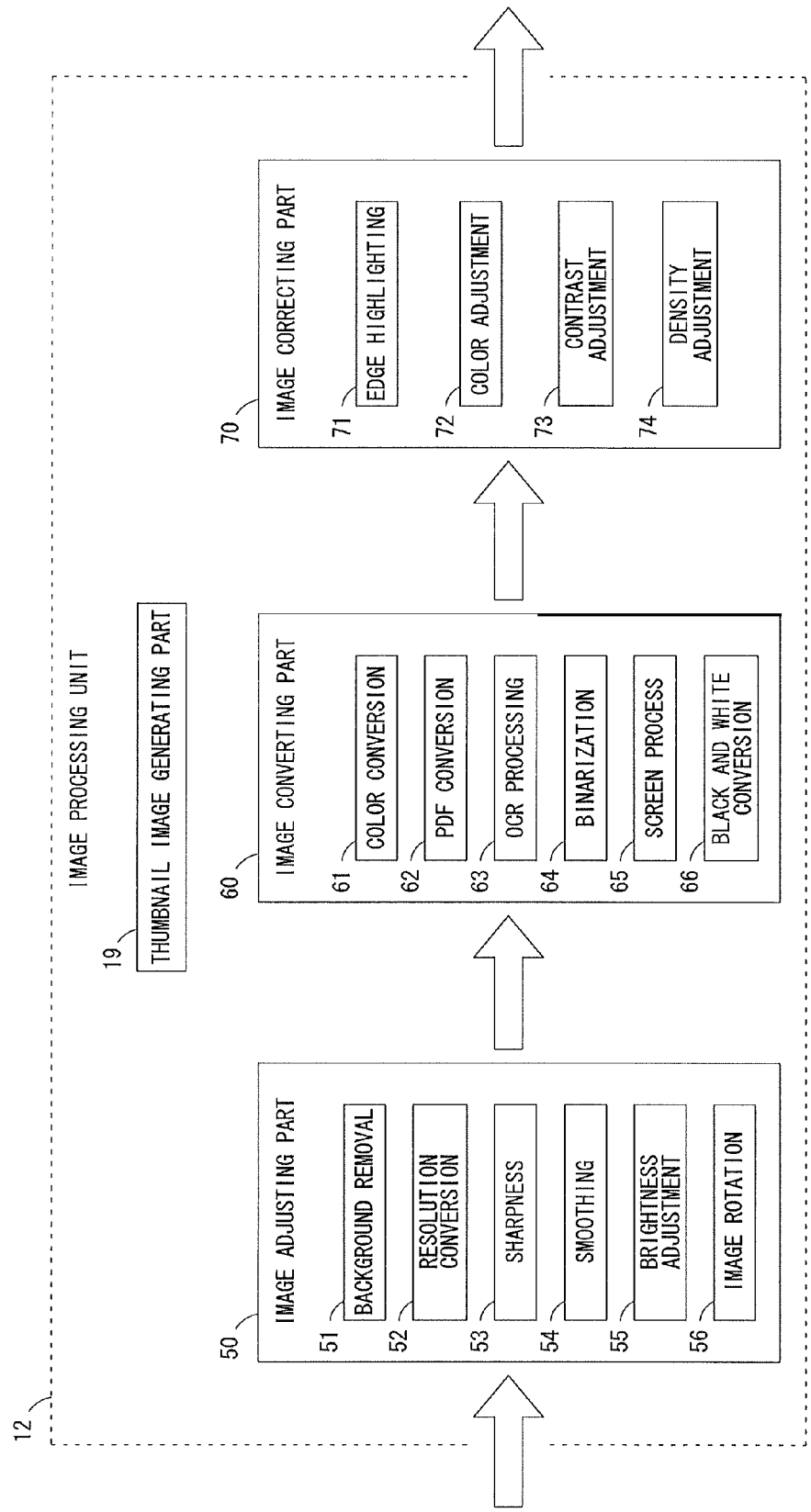
FIG. 5 is a block diagram showing an exemplary detailed configuration of an image processing unit.

FIG. 5 is a block diagram showing an exemplary detailed configuration of the image processing unit 12. The image processing unit 12 includes an image adjusting part 50, an image converting part 60 and an image correcting part 70. The image processing unit 12 brings each part sequentially, thereby processing the image data one by one.

The plurality of image processing performed by the image adjusting part 50 include a background removal 51, a resolution conversion 52, a sharpness 53, a smoothing 54, a brightness adjustment 55 and an image rotation 56. The image adjusting part 50 does not always perform all of the plurality of image processing 51 to 56 for every execution of the job. More specifically, the image adjusting part 50 selects the processing of the plurality of processing 51 to 56 set in advance by the user based on the job type or in response to the user's instruction and performs the selected processing.

The plurality of image processing performed by the image converting part 60 include a color conversion 61, a PDF (Portable Document Format) conversion 62, an OCR (Optical Character Reader) processing 63, a binarization 64, a screen process 65 and black and white conversion 66. The image converting part 60 does not always perform all of the plurality of image processing 61 to 66 for every execution of the job.

More specifically, the image converting part 60 selects the processing of the plurality of processing 61 to 66 set in advance by the user based on the job type or in response to the user's instruction and performs the selected processing as well as the image adjusting part 50.

The plurality of image processing performed by the image correcting part 70 include an edge highlighting 71, a color adjustment 72, a contrast adjustment 73 and a density adjustment 74. The image correcting part 70 does not always perform all of the plurality of processing 71 to 74 for every execution of the job. More specifically, the image correcting part 70 selects the processing of the plurality of processing 71 to 74 set in advance by the user based on the job type or in response to the user's instruction and performs the selected processing as well as the image adjusting part 50 and the image converting part 60.

The image processing unit 12 sequentially performs the image processing in accordance with the processing process set in advance by each of the image adjusting part 50, the image converting part 60 and the image correcting part 70, thereby generating the image data suitable for the image output. The image processing unit 12 reads the original image data in the input image data storage part 11a of the image memory 11 to perform the image processing. The processed image data generated by the first image processing is stored in the processed data storage part 11b of the image memory 11. The image processing unit 12 then reads the image data already processed in response to the previous image processing in the processed data storage part 11b of the image memory 11 to sequentially perform the following image processing. The image processing unit 12 sequentially updates the image data stored in the processed data storage part 11b one by one. The image data obtained by the image inputting unit 10 remaining the original data is stored in the input image data storage part 11a, and the image data sequentially updated in response to progress of the image processing is stored in the processed data storage part 11b.

The image processing unit 12 includes a thumbnail image generating part 19 as shown in FIG. 5. The thumbnail image generating part 19 reads the image data in the input image data storage part 11a and the processed data storage part 11b of the image memory 11 and reduces the image data to the thumbnail image, thereby saving the thumbnail image in the thumbnail image storage part lie. More specifically, after the image inputting unit 10 stores the image data to be the target of execution of the job in the input image data storage part 11a, the thumbnail image generating part 19 reads the image data and generates the thumbnail image corresponding to the image data obtained by the image inputting unit 10. As the variety of image processing is performed sequentially by each of the image adjusting part 50, the image converting part 60 and the image correcting part 70, the thumbnail image generating part 19 reads the processed image data in the processed data storage part 11b every time the image processing is performed and generates the thumbnail image corresponding to the image data which is processed in response to the variety of image processing sequentially. So, the thumbnail image generating part 19 generates the thumbnail corresponding to the image data changed in response to the image processing performed in accordance with the predetermined processing process sequentially and saves the generated thumbnail image in the thumbnail image storage part 11c. The thumbnail image generating part 19 does not necessarily serve as a part of the image processing unit 12. The thumbnail image generating part 19 may be installed outside the image processing unit 12.

The image data stored in the respective input image data storage part 11a, processed data storage part 11b and thumbnail image storage part 11c of the image memory 11 is hold until the time at least execution of the job is complete normally. The image data may also be hold until the predetermined period of time elapses after completion of execution of the job.

The aforementioned image processing unit 12 may carry out each of the variety of image processing performed by the respective image adjusting part 50, the image converting part 60 and the image correcting part 70 on a hardware separately installed or on a software.

For performing each aforementioned processing on the hardware separately installed, for example, the image processing unit 12 is allowed to activate each hardware all at once. The image processing unit 12, therefore, may perform the plurality of image processing as described above all at once, and carry out the image processing on the image data of the multiple pages in parallel. The high-speed processing can be realized on the hardware. All of the image processing in accordance with the predetermined processing process may be complete in few microseconds.

For performing each processing on the software, all functions of a CPU are used for the processing to process the image data of the single page. The image processing unit 12, therefore, is not allowed to carry out the processing to process the image data of the multiple pages in parallel like the hardware. If each of the image adjusting part 50, the image converting part 60 and the image correcting part 70 includes the different CPU, the image processing performed by the respective image adjusting part 50, image converting part 60 and image correcting part 70 may be carried out in parallel. Compared to the hardware, it is much slower to carry out the image processing on the software.

After the image processing in accordance with the predetermined processing process is performed by the image processing unit 12, the image outputting unit 13 is brought into operation next. The image outputting unit 13 reads the image data processed through the entire necessary image processing by the image processing unit 12 in the processed data storage part 11b and outputs the image in a predetermined way to output.

Figure 6:
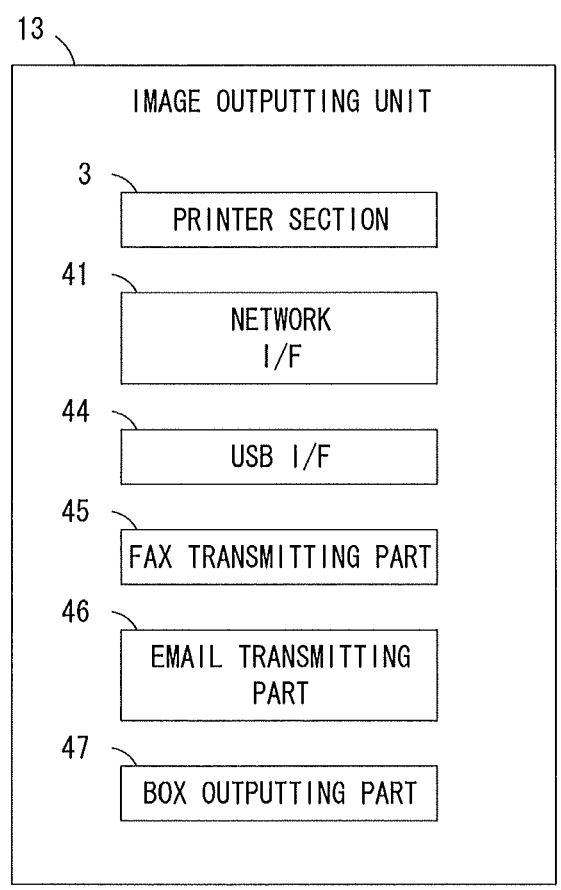
FIG. 6 is a block diagram showing an exemplary configuration of an image outputting unit.

The image outputting unit 13 includes the aforementioned printer section 3. The image outputting unit 13 also includes a variety of structures that are capable of outputting the image besides the printer section 3. FIG. 6 is a block diagram showing an exemplary configuration of the image outputting unit 13. As illustrated in FIG. 6, the image outputting unit 13 includes the printer section 3, the network interface 41, the USB interface 44, a fax transmitting part 45, an email transmitting part 46 and a box outputting part 47. The printer section 3 is brought into operation for executing the job such as the copy job or the print job, for instance to produce a printed output by forming an image on the printed sheet based on the image data stored in the processed data storage part 11b of the image memory 11. For executing the scan job, for instance, the network interface 41 sends the image data stored in the processed data storage part 11b of the image memory 11 to another computer over the network. The USB interface 44 outputs the image data stored in the processed data storage part 11b of the image memory 11 to the external storage device such as the USB memory to store. The fax transmitting part 45 generates fax data with the image data stored in the processed data storage part 11b of the image memory 11 and sends the generated fax data to an external address over the lines such as the public phone lines. The email transmitting part 46 creates an email containing the image data stored in the processed data storage part 11b of the image memory 11 as an attachment file and sends the email to an external email server over the network. For executing the scan job, for instance, the box outputting part 47 outputs the image data stored in the processed data storage part 11b of the image memory 11 to the storage region (BOX) in the hard disk device 14 to store.

As described above, the image outputting unit 13 includes the plurality of processing parts each of which is capable of outputting the image in a different way. The image outputting unit 13 outputs the image in a way set in advance by the user based on the job type or in response to the user's instruction.

Referring back to FIG. 2, the job controller 15 controls each operation of the aforementioned the image inputting unit 10, the image processing unit 12 and the image outputting unit 13, thereby controlling overall process of execution of the job on the image processing device 1. In response to starting execution of the job, the job controller 15 gives an instruction on the image processing that should be performed to the image processing unit 12 based on the job type or the settings configured in advance by the user. The job controller 15 also gives an instruction on the way how the image is output to the image outputting unit 13. After starting execution of the job, the job controller 15 causes the image inputting unit 10, the image processing unit 12 and the image outputting unit 13 to perform the necessary operations, respectively, thereby controlling a series of the operations performed for execution of the job.

The job controller 15 establishes communication with the operational panel 5 via the communication interface 16. The communication interface 16 establishes wired or radio communication. In response to starting execution of the job, the job controller 15 sends process detail of the processing performed by each of the image inputting unit 10, the image processing unit 12 and the image outputting unit 13 to the operational panel 5 via the communication interface 16. The job controller 15 sends the thumbnail image which is sequentially saved in the thumbnail image storage part 11c to the operational panel 5 from the start to completion of execution of the job.

By obtaining operation information from the operational panel 5 during execution of the job or after execution of the job is complete, the job controller 15 performs the processing in accordance with the operation information. More specifically, when receiving the operation information during execution of the job, for example, the job controller 15 temporarily suspends the job execution operation, changes the settings of the image processing performed during execution of the job or changes the way to output the image in accordance with the operation information received from the operational panel 5. In response to receiving the operation information containing a restart signal as temporarily suspending execution of the job, the job controller 15 cancels the temporal suspension and restarts execution of the job. The job controller 15 restarts execution of the job by causing the image processing to be started over again from the beginning with the original image data stored in the input image data storage part 11a of the image memory 11.

In response to receiving the operation information as the image data is still stored in each of the input image data storage part 11a, the processed data storage part 11b and the thumbnail image storage part 11c of the image memory 11 after execution of the job, the job controller 15 changes the settings of the image processing which has been performed during execution of the job or changes the way to output the image in accordance with the received operation information. After detecting again the user's instruction on execution of the job, the job controller 15 controls to start over again execution of the job from the beginning by using the original image data stored in the input image data storage part 11a of the image memory 11. In this case, the image inputting unit 10 is not required to obtain again the image data to be the target of execution of the job.

As illustrated in FIG. 2, the operational panel 5 includes a CPU 20, a ROM 21, a RAM 22, a display unit 24, a manipulation unit 25 and a communication interface 26. The CPU 20 is a computation unit that reads and executes a program 23 stored in advance in the ROM 21. The ROM 21 is formed from a nonvolatile memory, in which a variety of data besides the above-described program 23 is stored in advance. The RAM 22 stores therein data such as temporary data required in accordance with execution of the program 23 by the CPU 20. The RAM 22 also temporarily stores therein the thumbnail image received from the device body 1a. The display unit 24 on which various types of information is displayed to the user is formed from a device such as a color liquid crystal display, for example. The manipulation unit 25 receives entries of a variety of instructions by the user. The manipulation unit 25 is formed with parts such as touch panel sensors arranged on a screen of the display unit 24, for example. The communication interface 26 is an interface to establish wired or radio communication with the device body 1a.

With execution of the program 23, the CPU 20 of the operational panel 5 serves as a communication controlling part 31, a display controlling part 32, a manipulation detecting part 33. The communication controlling part 31 outputs information received from the device body 1a via the communication interface 26 to the display controlling part 32, or outputs the operation information received from the manipulation detecting part 33 to the communication interface 26 to send the information to the device body 1a.

The display controlling part 32 controls a screen image displayed on a viewing area of the display unit 24. The display controlling part 32 of the present preferred embodiment especially specifies the process detail of the processing that is performed by each of the image inputting unit 10, the image processing unit 12 and the image outputting unit 13 based on the information received from the job controller 15 when the job is executed on the image processing device 1. The display controlling part 32 displays a processing path of the various types of image processing sequentially performed by the image processing unit 12 after the image inputting unit 10 inputs the image data until when the image output by the image outputting unit 13 is complete on the viewing area of the display unit 24. With the processing path, the display controlling part 32 also displays the thumbnail image generated by the thumbnail generating part 19 on the viewing area of the display unit 24. The display controlling part 32 updates the processing path displayed on the viewing area of the display unit 24, thereby showing the progress of the image processing to process the image data. Also, the display controlling part 32 updates the thumbnail image displayed on the viewing area of the display unit 24 in conjunction with the update of the processing path.

The speed (interval) of updating the displayed processing path does not necessarily correspond to the process speed on the image processing unit 12. As already described above, when the image processing unit 12 is formed from the hardware, for example, all the image processing carried out on the image processing unit 12 only takes few microseconds to complete. If the screen image is updated at the same speed as the process speed on the image processing unit 12, the update process is not visible and the user cannot recognize it. The speed of updating the displayed processing path is preferably set slower than the process speed of the image processing actually performed on the image processing unit 12, and each processing path showing the corresponding progress of the image processing is preferably kept being displayed for a predetermined period of time or longer.

The manipulation detecting part 33 detects an operation when the user makes the operation on the manipulation unit 25. The manipulation detecting part 33 detects the user's operation as the processing path and the thumbnail image are being displayed on the viewing area of the display unit 24 by the display controlling part 32. The manipulation detecting part 33 then outputs the operation information based on the detected operation to the communication controlling part 31 and the display controlling part 32. After inputting the operation information from the manipulation detecting part 33, the display controlling part 32 updates the screen image displayed on viewing area of the display unit 24 in accordance with the input operation information. In response to inputting the operation information from the manipulation detecting part 33, the communication controlling part 31 sends the operation information to the job controller 15. The operation information sent to the job controller 15 from the manipulation detecting part 33 during execution of the job contains, for example, information including a stop signal to temporarily suspend execution of the job, instruction information specifying to change the image processing or the way to output performed during execution of the job or a restart signal to restart execution of the job. The operation information sent to the job controller 15 from the manipulation detecting part 33 after completion of execution of the job contains, for example, information including the instruction information specifying to change the image processing or the way to output performed during execution of the job or the instruction information specifying to start execution of the job over again from the beginning.

The screen images displayed on the viewing area of the operational panel 5 after execution of the job is started on the image processing device 1 with the above-described processing parts are explained in detail next. According to the present preferred embodiment, upon start of execution of the job, a first thumbnail image is mapped of an initial position in the processing path displayed on the viewing area of the display unit 24. The thumbnail image displayed in the processing path is changed to the newest one which is generated in response to execution of the variety of image processing. The display position of the thumbnail image is moved along the processing path so that the progress of the image processing to process the image data is displayed. The example of this process is described next.

Figure 7:
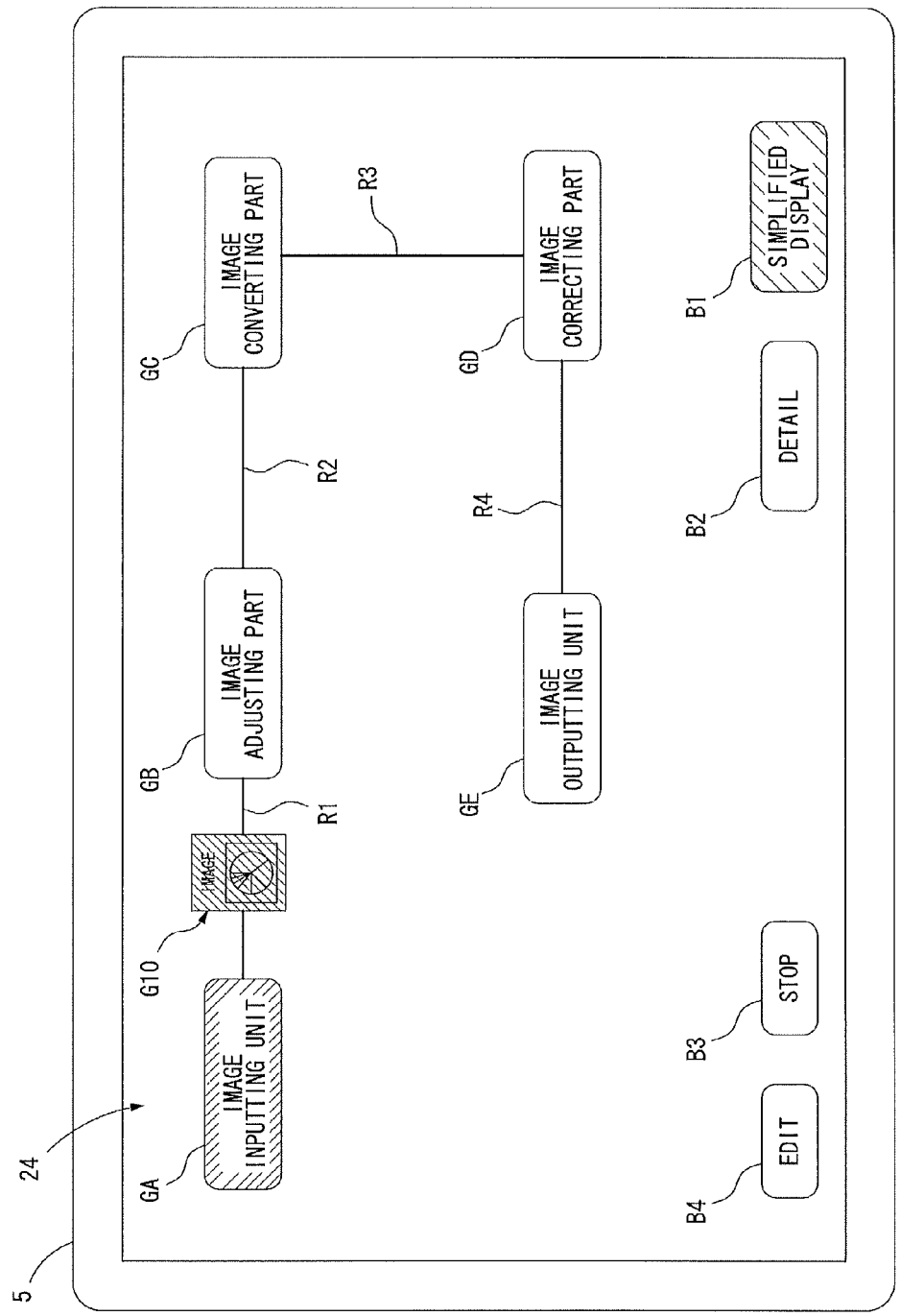
FIG. 7 is an example of a screen image displayed on a viewing area of an operational panel as the image processing device starts execution of a job.

FIGS. 7 to 12, each of which is an example of the screen image displayed on the viewing area of the operational panel 5 after execution of the job is started on the image processing device 1. In response to starting execution of the job, the image processing device 1 of the present preferred embodiment displays the processing path through which the image data goes from the time at which the image data, the target of execution of the job, is input to the image inputting unit 10 until when the image is output by the image outputting unit 13. FIG. 7 is an example of the screen image simply showing the processing path to process the image data displayed on the viewing area of the operational panel 5. The processing path to process the image data displayed on the viewing area of the display unit 24 of the operational panel 5 includes a process block GA corresponding to the image inputting unit 10, a process block GB corresponding to the image adjusting part 50 of the image processing unit 12, a process block GC corresponding to the image converting part 60 of the image processing unit 12, a process block GD corresponding to the image correcting part 70 of the image processing unit 12 and a process block GE corresponding to the image outputting unit 13. Those process blocks GA to GE are connected with path lines R1, R2, R3 and R4 in accordance with a process order and shown on the viewing area. In the screen image example of FIG. 7, the processing is performed in an order of the process blocks GA, GB, GC, GD and GE.

Inside each of the process blocks GA, GB, GC, GD and GE shown in the processing path, image processing information specifying the process detail of the processing to process the image data is displayed in a text format, for example. The user, therefore, is allowed to easily recognize what processing is performed in each process block GA, GB, GC, GD and GE.

FIG. 7 shows an example of the display when the image data to be the target of execution of the job is obtained by the image inputting unit 10. In this case, a thumbnail image G10 generated based on the image data obtained by the image inputting unit 10 is displayed in the first path line R1. By checking the thumbnail image G10 displayed in the first path line R1, the user is allowed to see how the image data obtained by the image inputting unit 10 looks.

After the processing by the image inputting unit 10 is complete as shown in FIG. 7, the display controlling part 32 updates the process block GA corresponding to the image inputting unit 10 to show differently from the unprocessed process blocks GB, GC, GD and GE. As a result, the user is allowed to easily recognize how far the process is carried out.

After the display controlling part 32 displays the screen image of FIG. 7 for at least the predetermined period of time or longer to make it visible to the user, it updates the screen image of the viewing area of the display unit 24, thereby showing the user that the image processing by the image processing unit 12 is moved forward. The screen image is updated as described above only when the image processing by the image processing unit 12 has actually been moved forward and the thumbnail image to be displayed in the following path line R2 has been generated.

Figure 8:
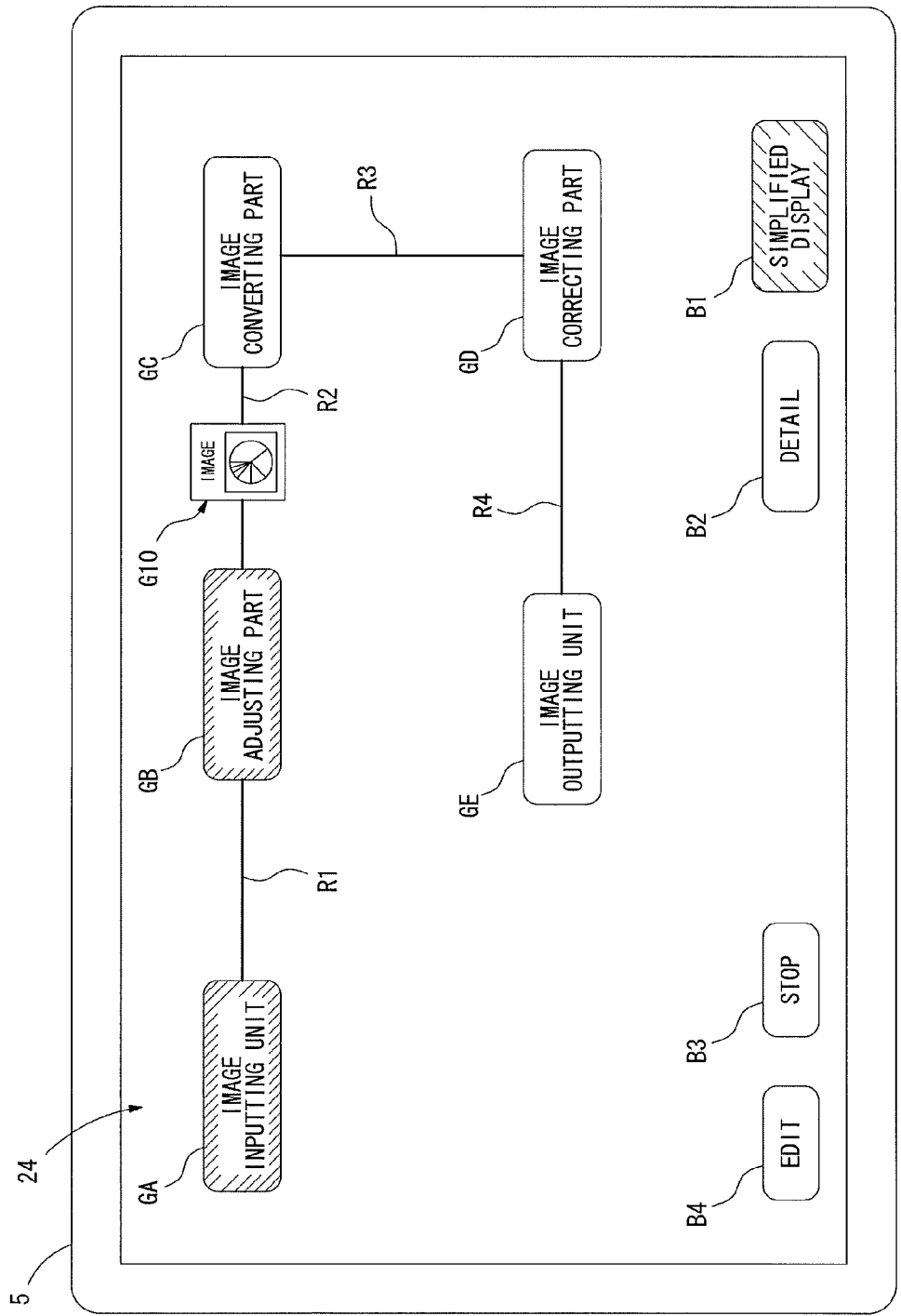
FIG. 8 is an example of a screen image displayed on the viewing area of the operational panel as the image processing device starts execution of the job.

FIG. 8 is an example of the screen image displayed on the viewing area of the display unit 24 after all image processing by the image adjusting part 50 is complete. To be more specific, by updating the screen image of FIG. 7 to the one of FIG. 8, the display controlling part 32 shows that the processing by the image adjusting part 50 of the image processing unit 12 is complete. The thumbnail image G10 generated based on the image data processed by the image adjusting part 50 is displayed in the path line R2. As a result, the user is allowed to see how the image data is changed in response to the image processing by the image adjusting part 50.

As shown in FIGS. 7 and 8, a simplified display key B1, a detail key B2, a stop key B3 and an edit key B4 are shown at the bottom of the screen image. The user is allowed to operate these keys B1 to B4 by tapping. In the examples of FIGS. 7 and 8, the screen image is simply showing the processing path. So, the simplified display key B1 of FIGS. 7 and 8 is being selected. If the user then taps the detail key B2, the screen image is switched to show the processing path in detail. In response to detecting that the detail key B2 is tapped by the user, the manipulation detecting part 33 outputs the operation information corresponds to the user's operation to the display controlling part 32. The display controlling part 32 then switches the screen image simply showing the processing path to the one showing the processing path in detail.

Figure 9:
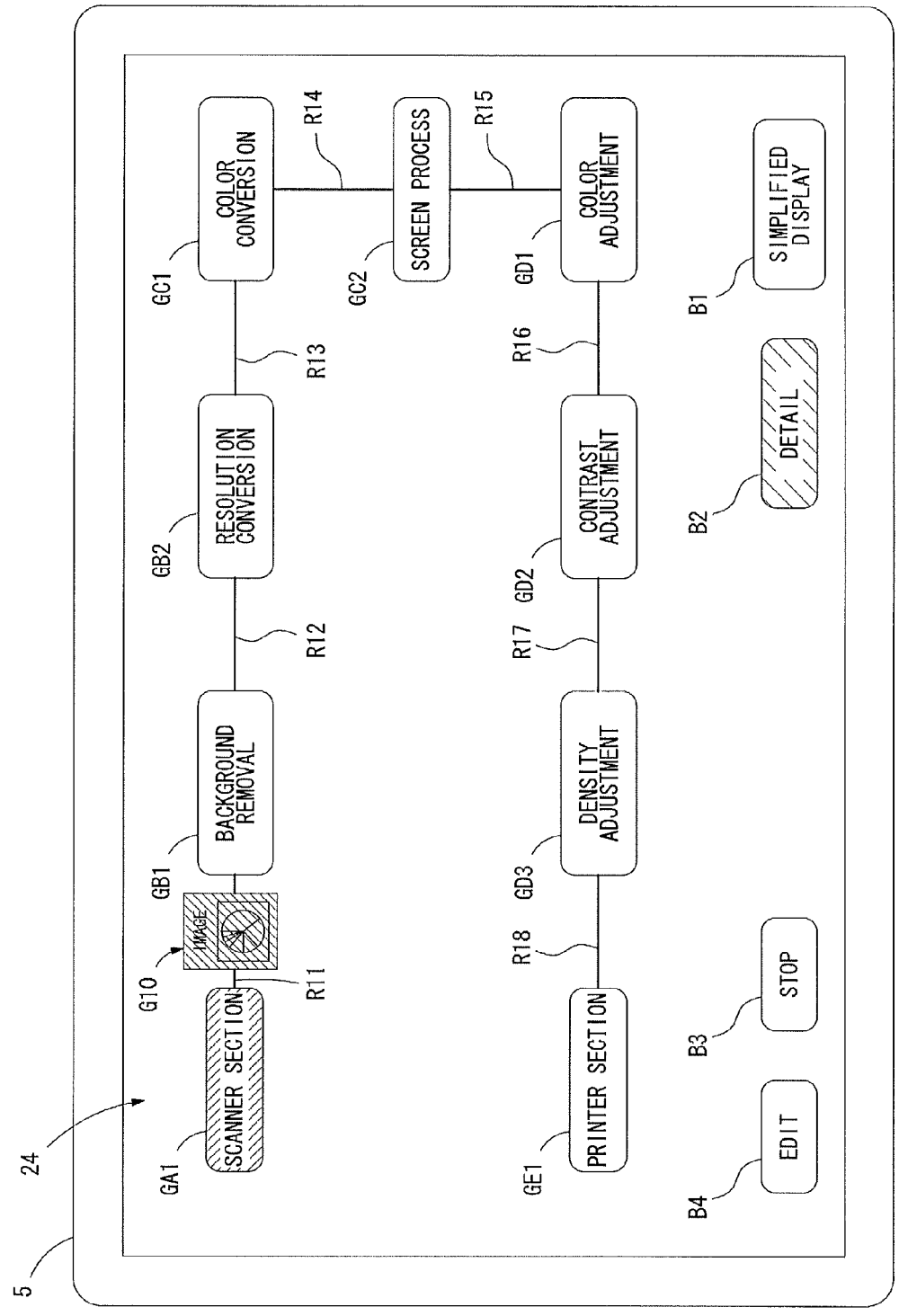
FIG. 9 is an example of a screen image displayed on the viewing area of the operational panel as the image processing device starts execution of the job.

FIGS. 9 to 12 are examples of the screen image showing the processing path in detail. By tapping the detail key B2, the process detail of the processing performed during execution of the job by each of the image inputting unit 10, the image processing unit 12 and the image outputting unit 13 is shown in detail as shown in FIG. 9. FIG. 9 shows an example of executing the copy job on the image processing device 1. The processing path to process the image data includes a process block GA1 corresponding to the scanner section 2, process blocks GB1 and GB2 corresponding to the respective background removal 51 and resolution conversion 52 performed by the image adjusting part 50, process blocks GC1 and GC2 corresponding to the respective color conversion 61 and screen process 65 performed by the image converting part 60, process blocks GD1, GD2 and GD3 corresponding to the respective color adjustment 72, contrast adjustment 73 and density adjustment 74 performed by the image correcting part 70 and a process block GE1 corresponding to the printer section 3. Those multiple process blocks GA1 to GE1 are connected with path lines R11 to R18 in accordance with a process order and shown in detail on the viewing area. Inside each of the process blocks GA1 to GE1 shown in the processing path, the image processing information specifying the process detail of the processing to process the image data is displayed in a text format, for example.

FIG. 9 is an example of the screen image when the image to be the target of execution of the job is obtained by the scanner section 2. In the example of FIG. 9, the thumbnail image G10 generated based on the image data obtained by the scanner section 2 is displayed in the first path line R11. By checking the thumbnail image G10 displayed in the path line R1, the user is allowed see how the image data obtained by the scanner section 2 looks.

Figure 10:
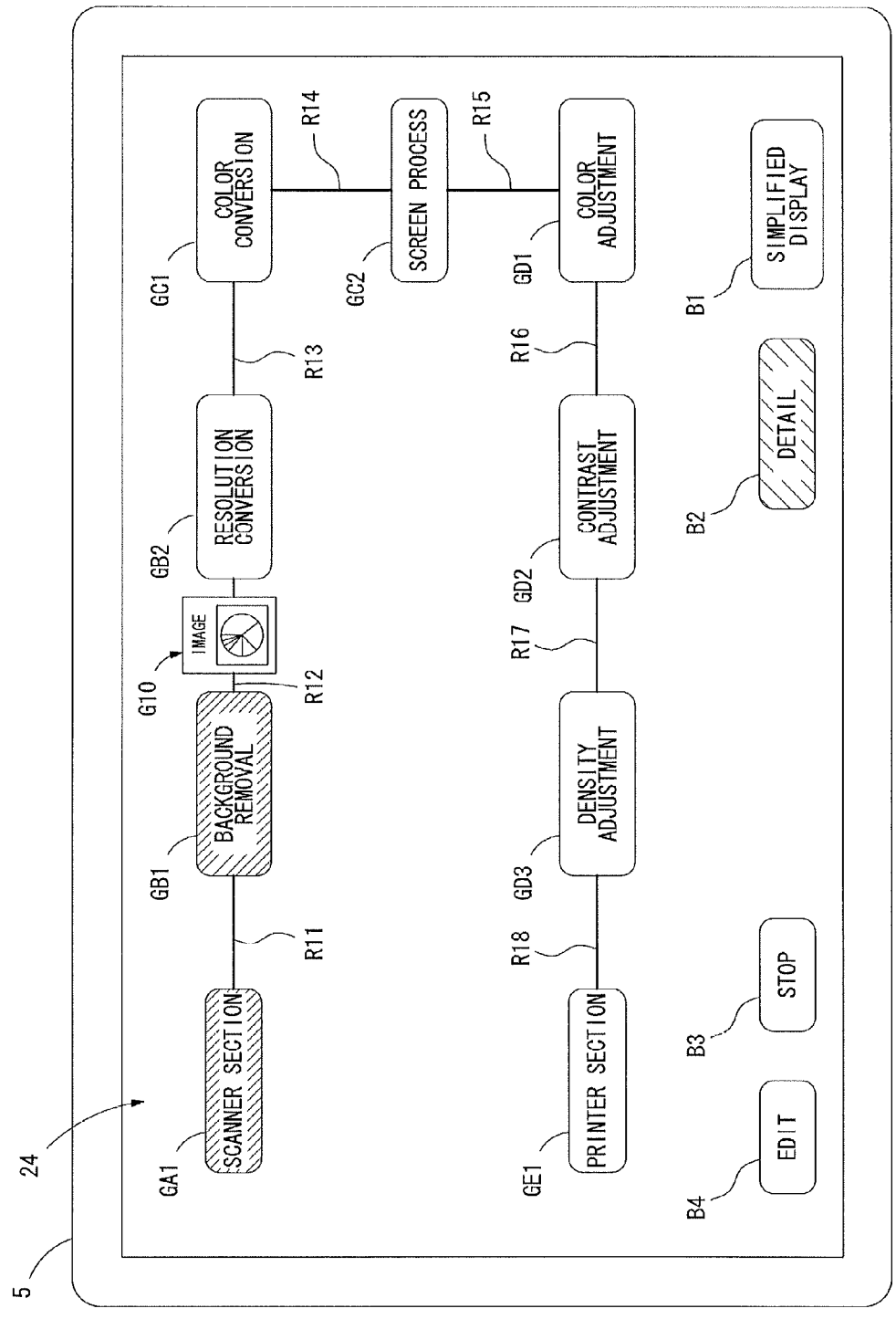
FIG. 10 is an example of a screen image displayed on the viewing area of the operational panel as the image processing device starts execution of the job.

In response to obtaining the thumbnail image generated based on the image data processed through the background removal 51 after the background removal 51 is complete by the image processing unit 12, the display controlling part 32 updates the screen image of FIG. 9 to the one of FIG. 10. In the example of FIG. 10, the thumbnail image G10 generated based on the image data processed through the background removal 51 is displayed in the following path line R12. By checking the screen image of FIG. 10, the user is allowed to see that the processing to the background removal 51 to process the image data is complete and how the image data is changed in response to the background removal 51.

Figure 11:
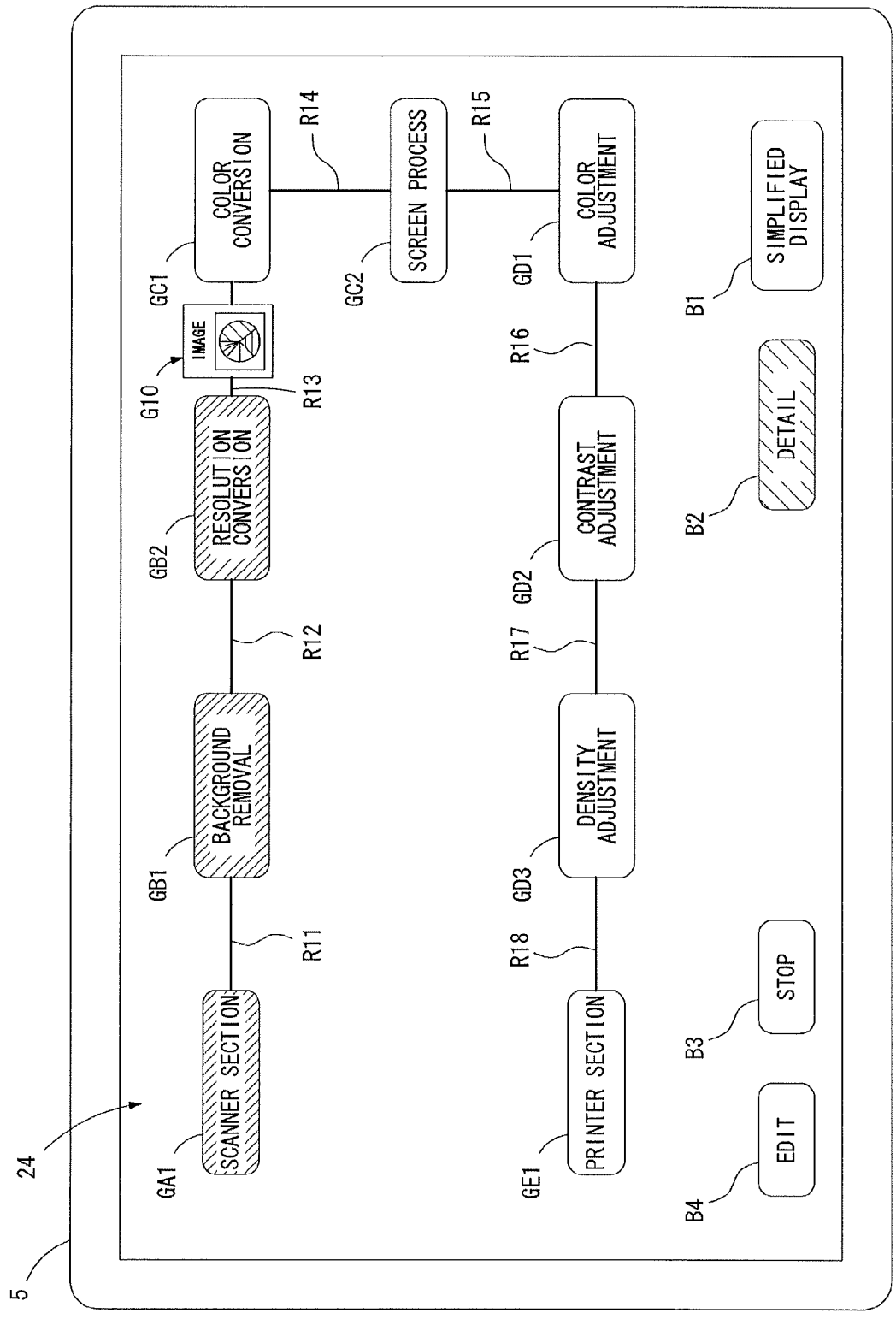
FIG. 11 is an example of a screen image displayed on the viewing area of the operational panel as the image processing device starts execution of the job.

In response to obtaining the thumbnail image generated based on the image data processed through the resolution conversion 52 after the resolution conversion 52 is complete by the image processing unit 12, the display controlling part 32 updates the screen image of FIG. 10 to the one of FIG. 11. In the example of FIG. 11, the thumbnail image G10 generated based on the image data processed through the resolution conversion 52 is displayed in the following path line R13. By checking the screen image of FIG. 11, the user is allowed to see that the processing to the resolution conversion 52 to process the image data is complete and how the image data is changed in response to the resolution conversion 52.

Figure 12:
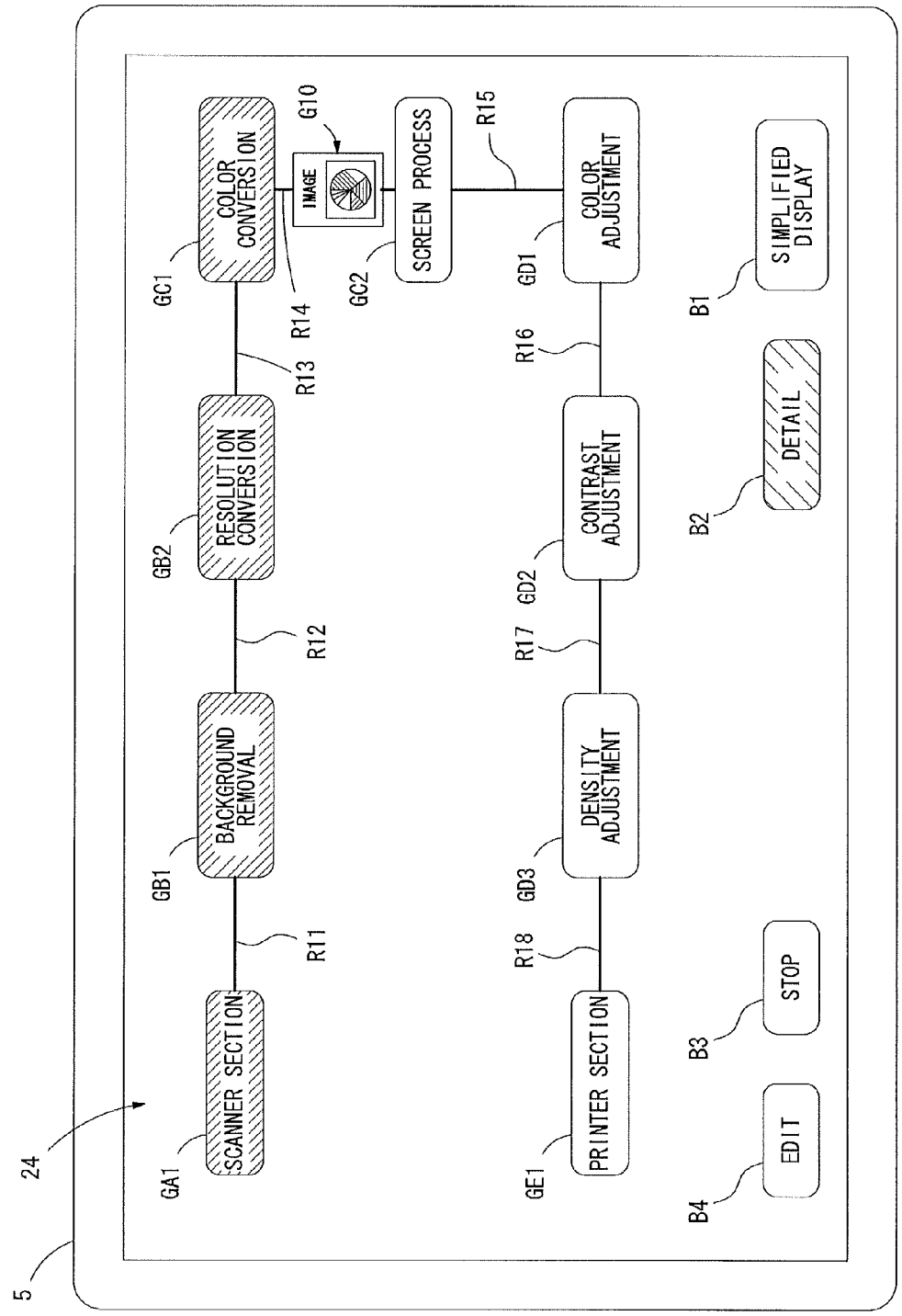
FIG. 12 is an example of a screen image displayed on the viewing area of the operational panel as the image processing device starts execution of the job.

In response to obtaining the thumbnail image generated based on the image data processed through the color conversion 61 after the color conversion 61 is complete by the image processing unit 12, the display controlling part 32 updates the screen image of FIG. 11 to the one of FIG. 12. In the example of FIG. 12, the thumbnail image G10 generated based on the image data processed through the color conversion 61 is displayed in the following path line R14. By checking the screen image of FIG. 12, the user is allowed to see that the processing to the color conversion 61 to process the image data is complete and how the image data is changed in response to the color conversion 61.

As described above, the display controlling part 32 updates the processing path displayed on the viewing area of the display unit 24 with the thumbnail image generated sequentially as the image processing performed by the image processing unit 12 is carried out. As a result, the user is allowed to see how the image data changes in response to what image processing of the various types of image processing performed by the image processing unit 12.

Figure 13:
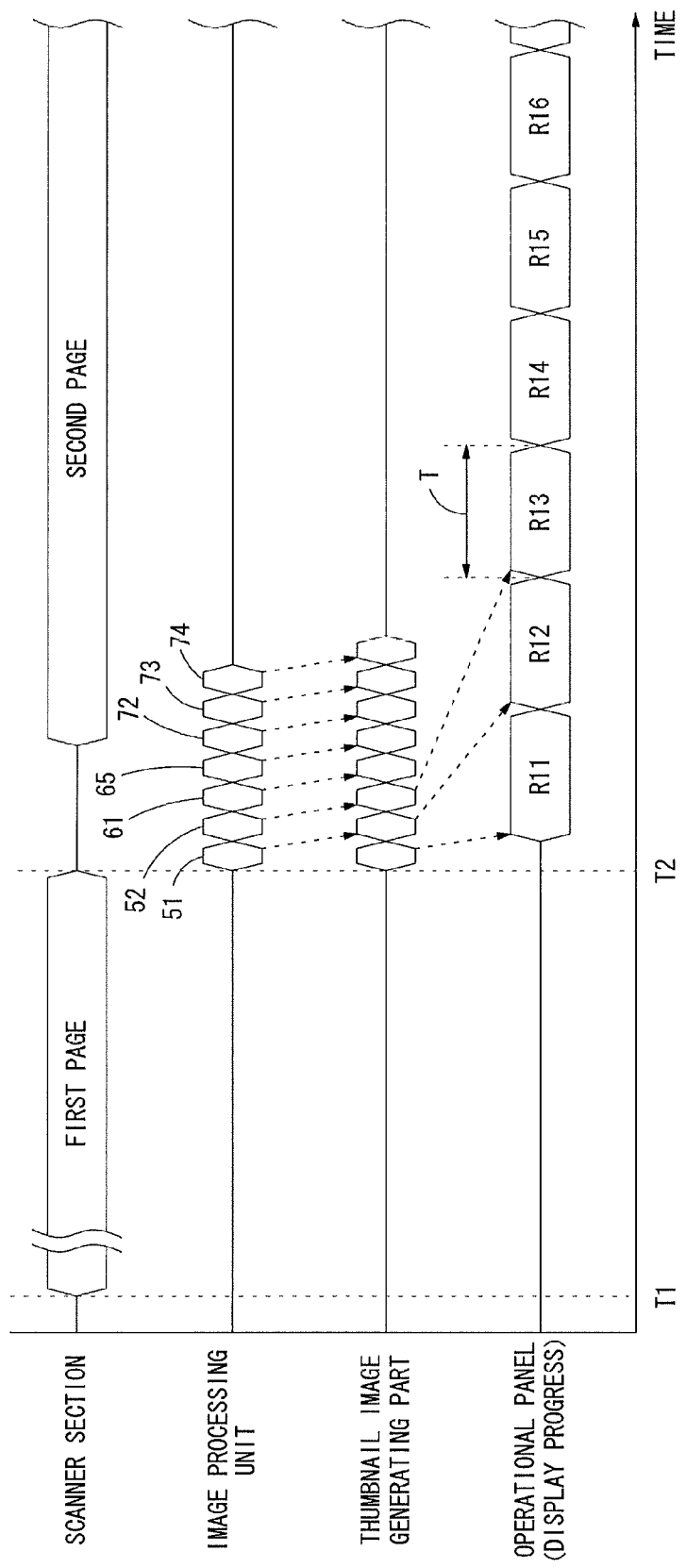
FIG. 13 is an exemplary timing chart when the image processing unit formed from the hardware performs a variety of image processing.

The time to update the progress of the image processing displayed on the viewing area of the operational panel 5 when the image processing unit 12 is formed from the hardware is described next, FIG. 13 is an exemplary timing chart for executing the copy job on the image processing device 1 when the image processing unit 12 is formed from the hardware. As shown in FIG. 13, the image processing device 1 starts driving the scanner section 2 to read a first page of the document at time T1 in response to the user's instruction on execution of the job. After the scanner section 2 starts reading the first page of the document at the time T1, it completes reading the first page at time T2. The image data of the first page is stored in the input image data storage part 11a of the image memory 11 at the time T2.

After reading the original image data in the input image data storage part 11a of the image memory 11 at the time T2, the image processing unit 12 performs the background removal 51, the resolution conversion 52, the color conversion 61, the screen process 65, the color adjustment 72, the contrast adjustment 73 and the density adjustment 74 sequentially. When the image processing unit 12 is formed from the hardware as shown in FIG. 13, it takes extremely short time for the image processing unit 12 to perform each image processing sequentially compared to the reading operation of the document by the scanner section 2. The processed image data is stored in the processed data storage part 11b of the image memory 11 in response to completion of the background removal 51, and the processed image data is immediately updated by the following processing.

The image processing unit 12 brings the thumbnail image generating part 19 at the time 2 when the original image data is stored in the input image data storage part 11a of the image memory 11. The thumbnail image generating part 19 reads the original image data stored in the input image data storage part 11a of the image memory 11 and generates the thumbnail image based on the read image data. The thumbnail image generating part 19 then saves the generated thumbnail image in the thumbnail image storage unit 11c. After that, the thumbnail image generating part 19 reads the processed image data to generate the thumbnail image based on the read image data and saves in the thumbnail image storage unit 11c every time the processed image data in the processed data storage part 11b is updated. The job controller 15 sends the thumbnail image generated sequentially by the thumbnail image generating part 19 to the operational panel 5.

After obtaining the first thumbnail image from the job controller 15, the operational panel 5 displays the thumbnail image in the path line R1 which is the initial position in the processing path as shown in FIG. 9. The first thumbnail image is displayed on the viewing area of the operational panel 5 relatively early after the scanner section 2 completes reading the first page of the document. While the first thumbnail image is being displayed, the operational panel 5 obtains the multiple thumbnail images to be displayed successively.

After displaying the first thumbnail image in the path line R11 for the predetermined period of time or longer, the operational panel 5 updates the processing path displayed on the viewing area of the display unit 24. More specifically, the operational panel 5 displays the thumbnail image that is generated based on the image data processed through the background removal 51 and is obtained in advance in the path line R12 which is the following position in the processing path as shown in FIG. 10, thereby updating the screen image. The operational panel 5 then displays the following thumbnail image in the following display position along the processing path and updates the screen image after displaying the previous thumbnail image in the path line for the predetermined period of time or longer.

Even it takes only a relatively short time for the image processing unit 12 to complete all the various types of image processing, the thumbnail image generated in response to each image processing may be displayed on the viewing area of the display unit 24 of the operational panel 5 for the predetermined period of time or longer. Thus, the user is allowed to see the progress of each image processing performed during execution of the job or how the image data changes in response to each image processing.

Figure 14:
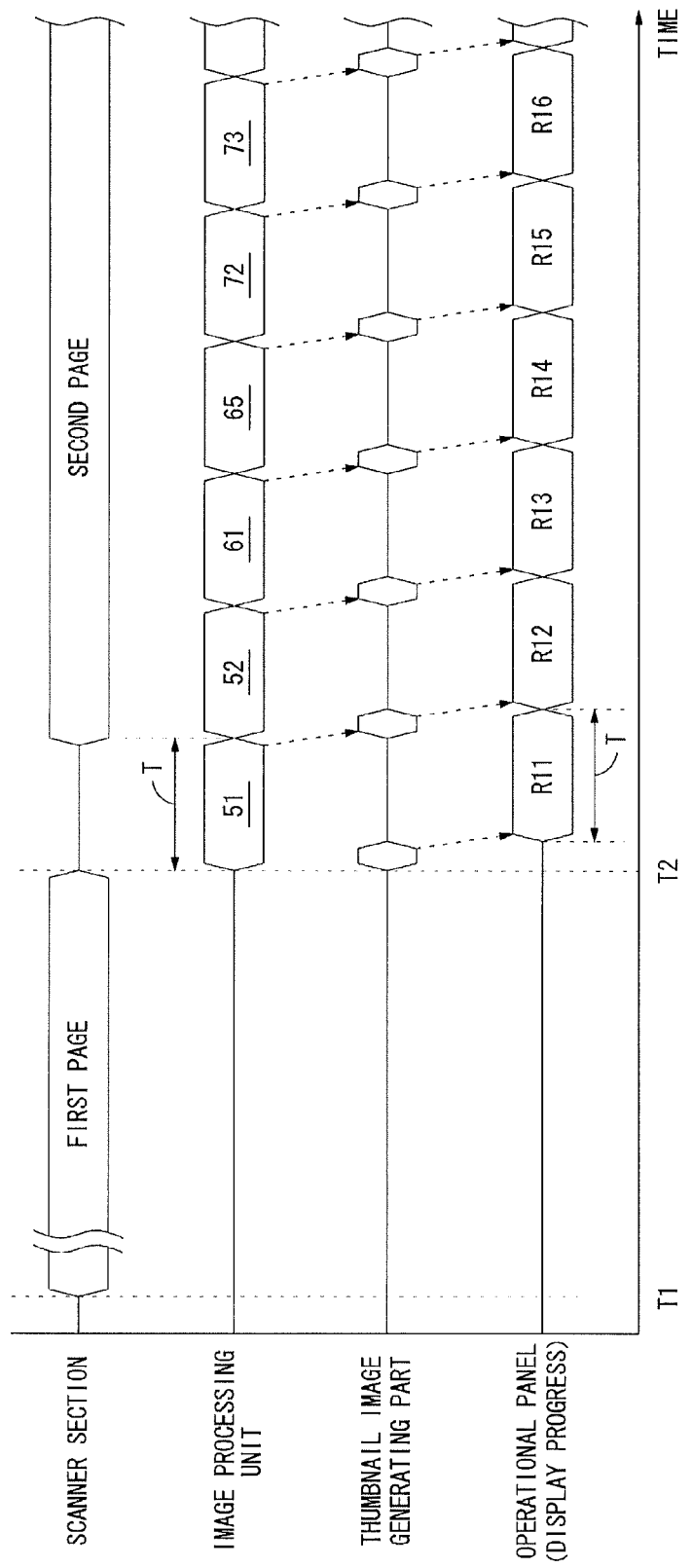
FIG. 14 is an exemplary timing chart when the image processing unit formed from the software performs the variety of image processing.

The time to update the progress of the image processing displayed on the viewing area of the operational panel 5 when the image processing unit 12 is formed from the software is described next. FIG. 14 is an exemplary timing chart for executing the copy job on the image processing device 1 when the image processing unit 12 is formed from the software. As shown in FIG. 14 as described above, the scanner section 2 starts reading the first page of the document at the time T1 and the image data of the first page is stored in the input image data storage part 11a of the image memory 11 at the time T2.

After reading the original image data in the input image data storage part 11a of the image memory 11 at the time T2, the image processing unit 12 formed from the software performs the background removal 51, the resolution conversion 52, the color conversion 61, the screen process 65, the color adjustment 72, the contrast adjustment 73 and the density adjustment 74 sequentially. When the image processing unit 12 formed from the software as shown in FIG. 14 performs each image processing, it takes a time longer than the processing time required for the image processing unit 12 formed from the hardware to perform each image processing sequentially. The image data processed through each image processing in the processed data storage part 11b of the image memory 11 is immediately updated.

The image processing unit 12 brings the thumbnail image generating part 19 at the time 2 at which the original image data is stored in the input image data storage part 11a of the image memory 11. The thumbnail image generating part 19 reads the original image data stored in the input image data storage part 11a of the image memory 11 and generates the thumbnail image based on the read image data. The thumbnail image generating part 19 then saves the generated thumbnail image in the thumbnail image storage unit 11c. The thumbnail image generating part 19 thins out to read the image data stored in the image memory so that it is allowed to generate the thumbnail image relatively easy even when the thumbnail image generating part 19 is brought into operation on the software. Thus, it does not require as long time as each image processing such as the background removal 51 to generate the thumbnail image. The job controller 15 then sends the thumbnail image generated sequentially by the thumbnail image generating part 19 to the operational panel 5.

After obtaining the first thumbnail image from the job controller 15, the operational panel 5 displays the obtained thumbnail image in the path line R1 which is the initial position in the processing path as shown in FIG. 9. The first thumbnail image is displayed on the viewing area of the operational panel 5 relatively early after the scanner section 2 completes reading the first page of the document even when the image processing is performed by the software. On the other hand, the operational panel 5 obtains the following thumbnail image only when the processing of the background removal 51 is complete by the image processing unit 12.

It is assumed, for example, that the processing time required for each image processing performed by the software is longer than the predetermined period of time T which is the time for keeping displaying the thumbnail image in the path line when the image processing unit 12 is formed from the hardware. In this case, the operational panel 5 updates the displayed processing path at the time of receiving the thumbnail image from the job controller 15 as shown in FIG. 14. Even in this case, the thumbnail image generated in response to each image processing is allowed to be displayed for the predetermined period of time T or longer on the viewing area of the display unit 24 of the operational panel 5. Thus, the user is allowed to see the progress of each image processing performed during execution of the job or how the image data changes in response to each image processing. Further, in this case, the thumbnail image and the image processing performed by the image processing unit 12 are synchronized and the thumbnail image is allowed to be displayed in real-time.

The processing time required for each image processing is sometimes shorter than the predetermined period of time T even when the image processing is performed by the image processing unit 12 formed from the software. In such cases, the time to display the thumbnail image is configured to be longer than the processing time required for each image processing performed by the image processing unit 12, and the thumbnail image should be kept being displayed for at least the predetermined period of time T or longer.

The user's operation and the operation performed by the image processing device 1 in response to the user's operation in the process whereby the processing path displayed on the viewing area of the operational panel 5 is updated are described next.

Figure 15:
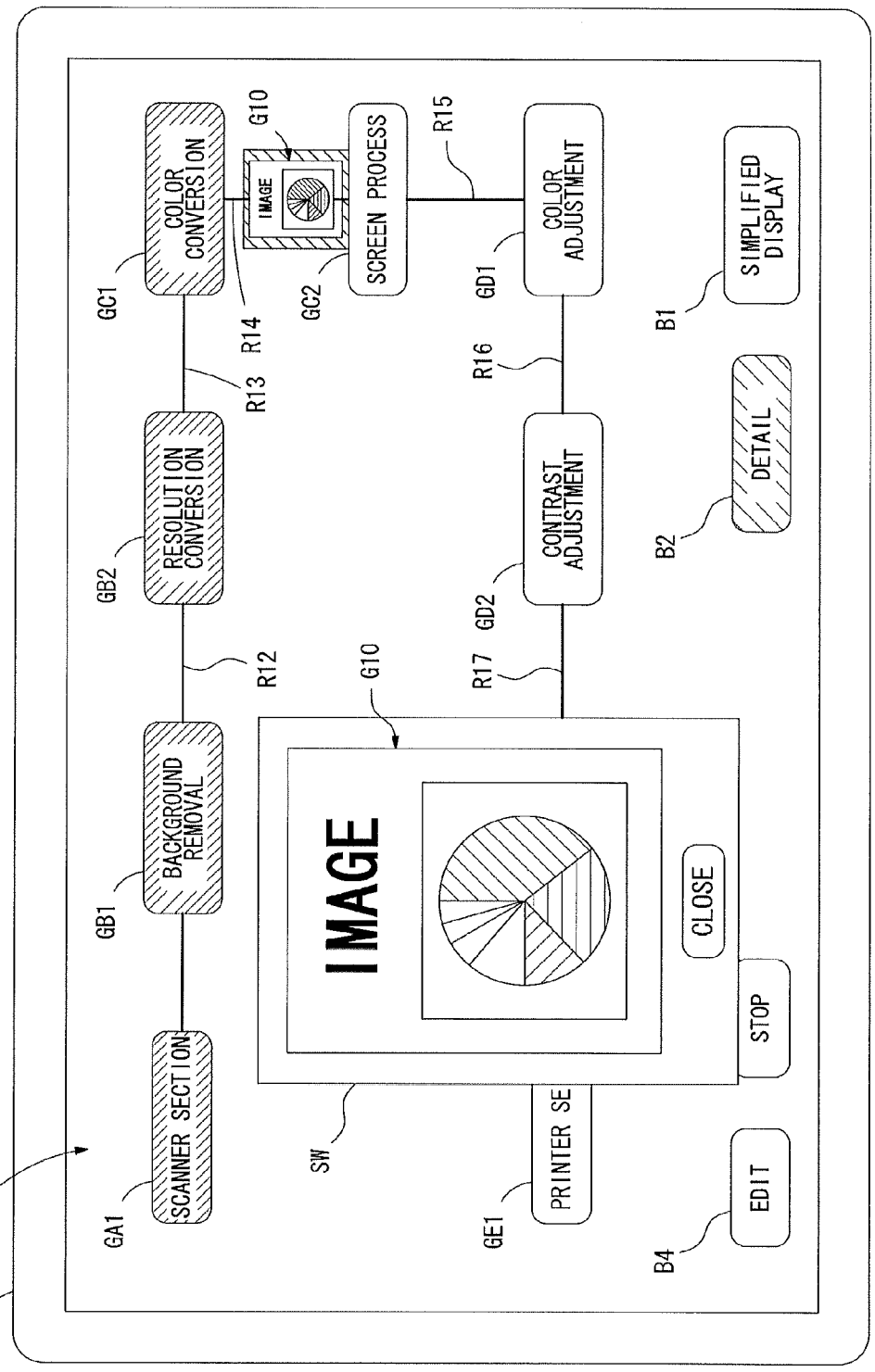
FIG. 15 shows an example of a screen image displayed when a thumbnail image is tapped by a user.

FIG. 15 shows an example of the screen image to be displayed on the viewing area of the display unit 24 when the thumbnail image G10 is tapped by the user with the screen image of FIG. 12 being displayed, for example. As the thumbnail image G10 moves along the processing path in turn is tapped by the user at a random position, the enlarged thumbnail image G10 at the time of tapping operation is appeared as a sub window SW as illustrated in FIG. 15. More specifically, after the operation to tap the thumbnail image G10 is detected by the manipulation detecting part 33, the display controlling part 32 enlarges the tapped thumbnail image G10 and displays the sub window SW including the enlarged thumbnail image G10 on at least a part of the viewing area of the display unit 24. When the user would like to check side by side of the relatively small thumbnail image G10 moves along the processing path, he or she taps the moving thumbnail image G10. The sub window SW is then appeared, and the user is allowed to easily check the enlarged thumbnail image G10 side by side.

The execution of the job may be temporarily suspended when the sub window SW as shown in FIG. 15 is displayed during execution of the job. In this case, in response to detecting that the thumbnail image G10 is tapped, the manipulation detecting part 33 sends the operation information containing a stop signal to the job controller 15. When receiving the operation information containing the stop signal during execution of the job, the job controller 15 temporarily suspends the operation of each image inputting unit 10, image processing unit 12 and image outputting unit 13, thereby temporarily suspending a series of operations performed for execution of the job. The job controller 15 temporarily suspends the image processing of every processing process performed by the image processing unit 12. The job may be the one to produce the printed output by driving the printer section 3 by the image outputting unit 13. In this case, if the feeding operation to produce the printed output based on the image data has already been started, the feeding operation is not allowed to be suspended in the middle of the operation. When the feeding operation has already been started on the printer section 3, the job controller 15 continues the processing to produce the printed output for the paper being fed, then suspending the feeding operation for the papers to be fed after the suspension.

Figure 16:
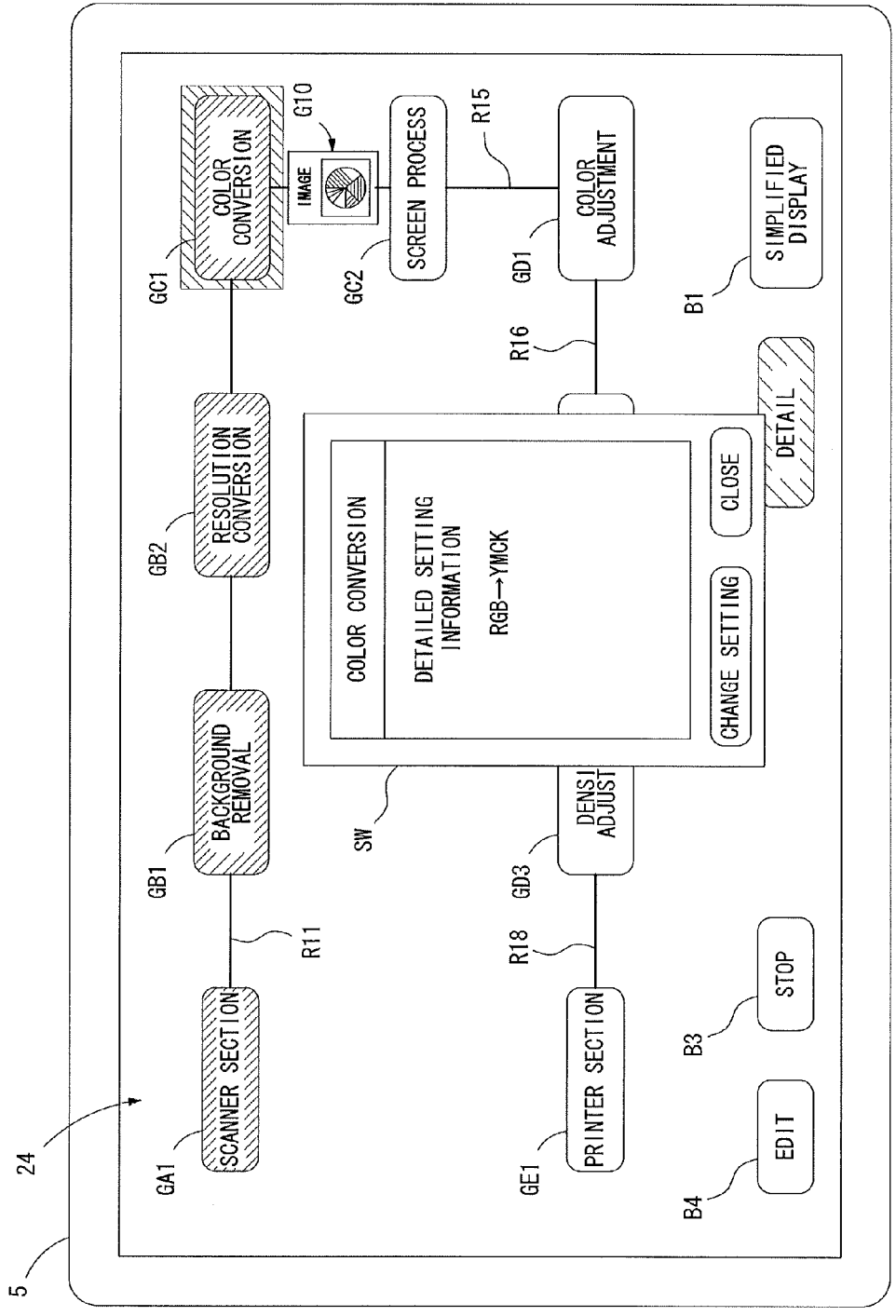
FIG. 16 shows an example of a screen image displayed when a process block is tapped by the user.

The execution of the job is temporarily suspended not only when the thumbnail image G10 is tapped, but also when the stop key B3 is tapped by the user, for instance, FIG. 16 shows an example of the screen image to be displayed on the viewing area of the display unit 24 when the process block GC1 corresponding to the color conversion 61 is tapped by the user with the screen image of FIG. 12 being displayed, for example. As the process block GC1 in the processing path is voluntarily tapped by the user with the processing path being displayed on the viewing area of the display unit 24, the sub window SW showing the detailed setting information of the image processing corresponding to the process block GC1 tapped by the user is displayed as illustrated in FIG. 16. More specifically, after the operation to tap the process block GC1 is detected by the manipulation detecting part 33, the display controlling part 32 identifies the tapped process block GC1 and generates detailed setting information of the image processing corresponding to the process block GC1 based on information relating to the process detail obtained at the start of execution of the job from the job controller 15. The display controlling part 32 displays the sub window SW showing the detailed setting information on at least a part of the viewing area of the display unit 24. When the user would like to check what image processing is performed corresponding to the process block GC1 displayed in the processing path, he or she taps the process block GC1, thereby making the sub window SW appear. The execution of the job may be temporarily suspended when the sub window SW as shown in FIG. 16 is displayed during execution of the job.

The user may tap a change setting key while the sub window SW as shown in FIG. 16 is being displayed. In such a case, the settings of the image processing unit 12 may be changed. By tapping the change setting key, the user is allowed to change the settings of the image processing corresponding to the selected process block GC1 (the color conversion 61), to delete the image processing corresponding to the selected process block GC1, or to change the image processing by adding another image processing before or after the processing corresponding to the selected process block GC1. When the user determines that the image processing as intended is not carried out by checking the thumbnail image G10 generated after the image processing corresponding to the color conversion 61, he or she makes change in the settings by tapping the change setting key. As a result, the user is allowed to change the settings to make the image processing as intended perform during execution of the job.

After detecting the operation to change the settings of the image processing unit 12, the manipulation detecting part 33 determines the operation is to delete the image processing, to make change in the settings of the image processing or to add the image processing. The manipulation detecting part 33 generates the operation information containing the instruction information to the job controller 15 based on the determination result and sends the generated operation information to the job controller 15. In response to receiving the operation information from the manipulation detecting part 33, the job controller 15 changes the current settings on the image processing unit 12 in accordance with the instruction information contained in the received operation information.

The settings for the image processing already performed by the image processing unit 12 may be changed or the image processing already performed by the image processing unit 12 may be deleted in response to the user's operation. In such a case, the job controller 15 discards the image data stored in the processed data storage part 11b of the image memory 11 and the thumbnail image saved in the thumbnail image storage part 11c. The job controller 15 then gives an instruction to the image processing unit 12 to start over again the image processing, the settings for which is changed, from the beginning with the original image data stored in the input image data storage part 11a. So, if the image processing not as intended by the user has already been carried out, the image processing is started over again from the beginning so that the image data as intended by the user may be obtained.

After the user taps the edit key B4, an edit screen image not shown in figures is displayed on the viewing area of the display unit 24 of the operational panel 5. With the edit screen image, the user is allowed to freely edit the image data by checking the preview image of the image data stored in the processed data storage part 11b, for example. This allows the user to add data such as texts or images not contained in the image data obtained by the image inputting unit 10, for instance, in the middle of execution of the job.

Figure 17:
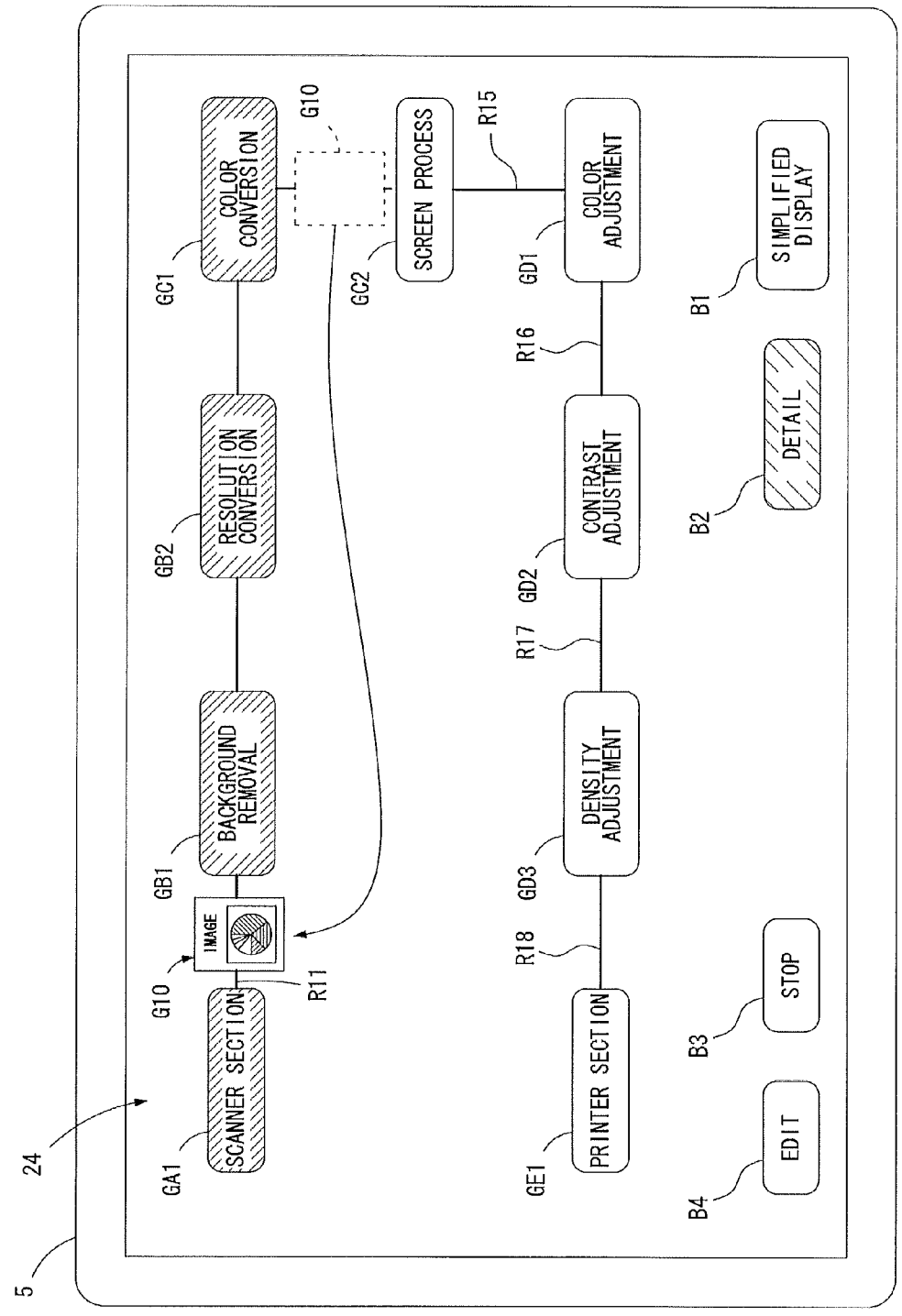
FIG. 17 shows an example of a screen image displayed when the thumbnail image is dragged and moved by the user.

FIG. 17 shows an example of the screen image to be displayed on the viewing area of the display unit 24 when the thumbnail image G10 is dragged and moved by the user with the screen image of FIG. 12 being displayed, for example. The user drags the thumbnail image G10 displayed on the given position in the processing path while the processing path is being displayed on the viewing area of the display unit 24 so that he or she may move the thumbnail image G10 to another position. In order to display the thumbnail image G10 moved to another position, the display controlling part 32 selects and displays the thumbnail image G10 corresponds to the position. Even when the user misses the chance to see the change of the thumbnail image G10 in response to the progress of the image processing, for example, he or she turns the thumbnail image G10 back over the processing path. The user, therefore, is allowed to see again the change in the thumbnail image G10.

In the example as described above, the image data to be the target of execution of the job is obtained by the scanner section 2 by reading each page of the document. As a result, there is a predetermined period of time after the image data of the first page is obtained and before the image data of the second page is obtained. For displaying the thumbnail image G10 in the processing path displayed on the viewing area of the display unit 24, the thumbnail image G10 corresponding to the image data of each page is displayed at the different position. So, the progress of the image processing performed for each page may be displayed.

The image data to be the target of execution of the job may be received via the network interface 41, for example. In such a case, the image data of the multiple pages may be obtained all at once. The image processing unit 12 then is capable of performing the image processing to process the image data of each page in series without any interval. When the image processing unit 12 is formed from the hardware, all image processing to process the image data of the multiple pages is complete in a short time. In this case, for displaying the thumbnail image in the processing path, the display controlling part 32 displays the multiple thumbnail images corresponding to the image data of the multiple pages at the same position, thereby displaying the progress of the image processing performed for each job.

The image data of each page changes differently in response to each of the variety of image processing. For displaying the multiple thumbnail images corresponding to the image data of the multiple pages at the same position in the processing path, the thumbnail image corresponding to the image data of each page is preferably displayed to the user in a manner that allows the user to see the change in each thumbnail image corresponding to the image data of each page brought before and after the image processing.

Figure 18A:
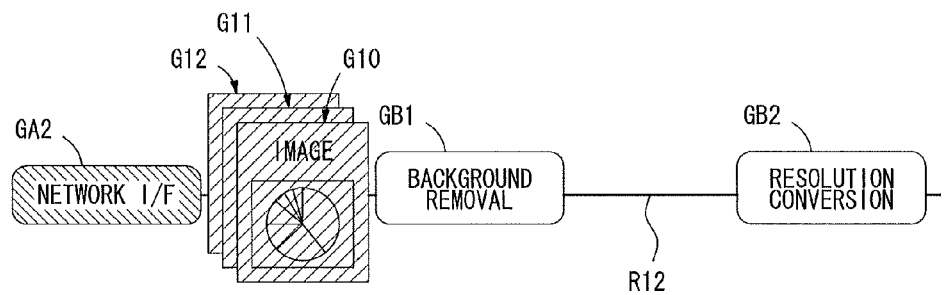
FIGS. 18A, 18B and 18C show the exemplary ways of selecting the thumbnail image corresponding to the image data of a page about which a greatest change is brought before and after the image processing and displaying it foreground when displaying the multiple thumbnail images at the same position in the processing path.
Figure 18B:
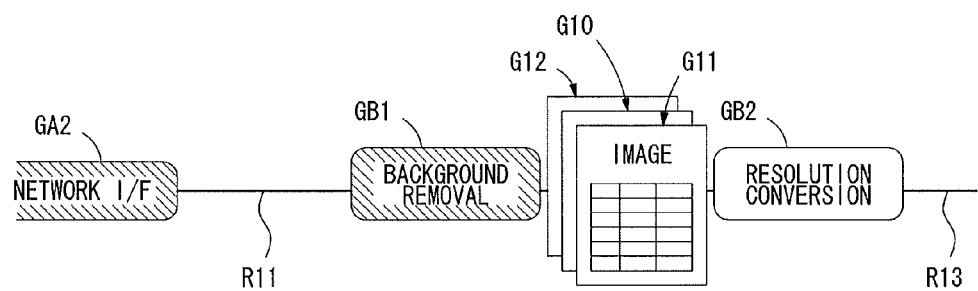
Figure 18C:
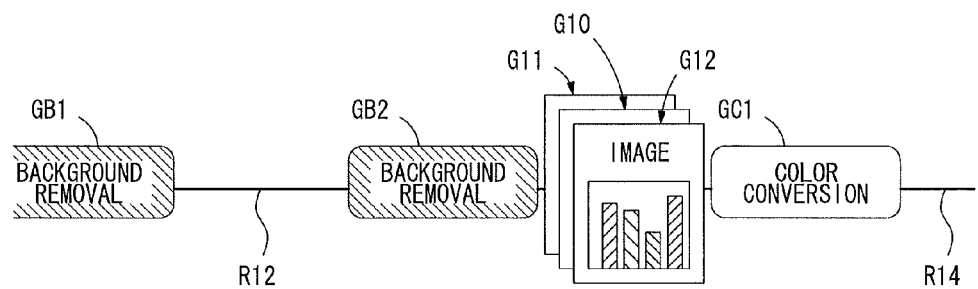

FIGS. 18A, 18B and 18C show the exemplary ways of selecting the thumbnail image corresponding to the image data of the page about which a greatest change is brought before and after the image processing and displaying it foreground when displaying the multiple thumbnail images G10, G11 and G12 at the same position in the processing path. When the network interface 41 obtains the image data of three pages, three thumbnail images G10, G11 and G12 are displayed on the lower side of the process block GA2 corresponding to the network interface 41 as illustrated in FIG. 18A. These three thumbnail images G10, G11 and G12 are displayed in accordance with a sorting order. So, the thumbnail image G10 is displayed foreground, the thumbnail image G11 is displayed back of the thumbnail image G10 and the thumbnail image G12 is displayed the end. These thumbnail images G10, G11 and G12 are laid on top of one another and displayed.

The thumbnail images G10, G11 and G12 corresponding to the image data of the multiple pages are taken forward into the next stage to proceed the next image processing, and they are displayed on the lower side of the process block GB1 corresponding to the background removal 51 as illustrated in FIG. 18B. In this case, the thumbnail images G10, G11 and G12 corresponding to the image data actually processed through the background removal 51 are displayed. The display controlling part 32 gets the difference between the thumbnail images before and after the background removal 51. The thumbnail image having the greatest difference is laid foreground and the one having the second greatest difference is laid back. Thus, the thumbnail images are arranged in descending order of difference. In the example of FIG. 18B, the thumbnail image G11 is displayed foreground, the thumbnail image G10 is displayed back of the thumbnail image G11 and the thumbnail image G12 is displayed the end. As a result, the user is allowed to know that the image data of the second page is changed the most in response to the background removal 51 and to see how the image data of the second page is changed by viewing the thumbnail image G11 displayed foreground.

The thumbnail images G10, G11 and G12 corresponding to the image data of the multiple pages are taken forward into the next stage to proceed the next image processing, and they are displayed on the lower side of the process block GB2 corresponding to the resolution conversion 52 as illustrated in FIG. 18C. In this case, the thumbnail images G10, G11 and G12 corresponding to the image data actually processed through the resolution conversion 52 are displayed. The display controlling part 32 gets the difference between the thumbnail images before and after the resolution conversion 52. The thumbnail image having the greatest difference is laid foreground and the one having the second greatest difference is laid back. Thus, the thumbnail images are arranged in descending order of difference. In the example of FIG. 18C, the thumbnail image G12 is displayed foreground, the thumbnail image G10 is displayed back of the thumbnail image G12 and the thumbnail image G11 is displayed the end. As a result, the user is allowed to know that the image data of the third page is changed the most in response to the resolution conversion 52 and to see how the image data of the third page is changed by viewing the thumbnail image G12 displayed foreground.

As described above, the display controlling part 32 gets the difference between the thumbnail images, thereby determining the thumbnail image corresponding to the image data of the page about which a greatest change is brought in response to the image processing. In order to identify the image changed the most in response to the image processing, the image may be analyzed. For the background removal 51, the image, tone of background of which is changed the most, for the color conversion 61, the image containing the most colors, and for density adjustment, the image containing the most medium tone, for example, may be analyzed to determine the image changed the most in response to the image processing.

Figure 19A:
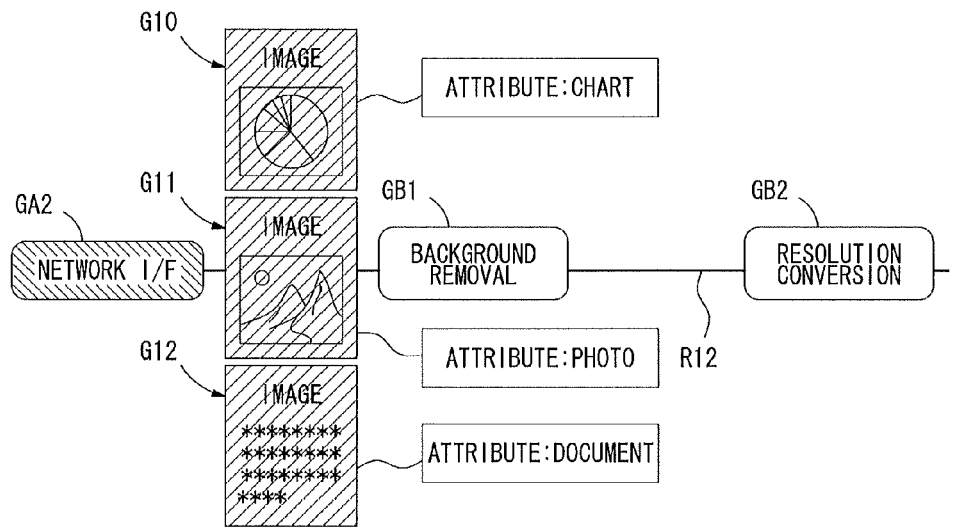
FIGS. 19A and 19B show the exemplary ways of displaying each of the multiple thumbnail images separately based on a corresponding image attribute when displaying the multiple thumbnail images at the same position in the processing path.
Figure 19B:
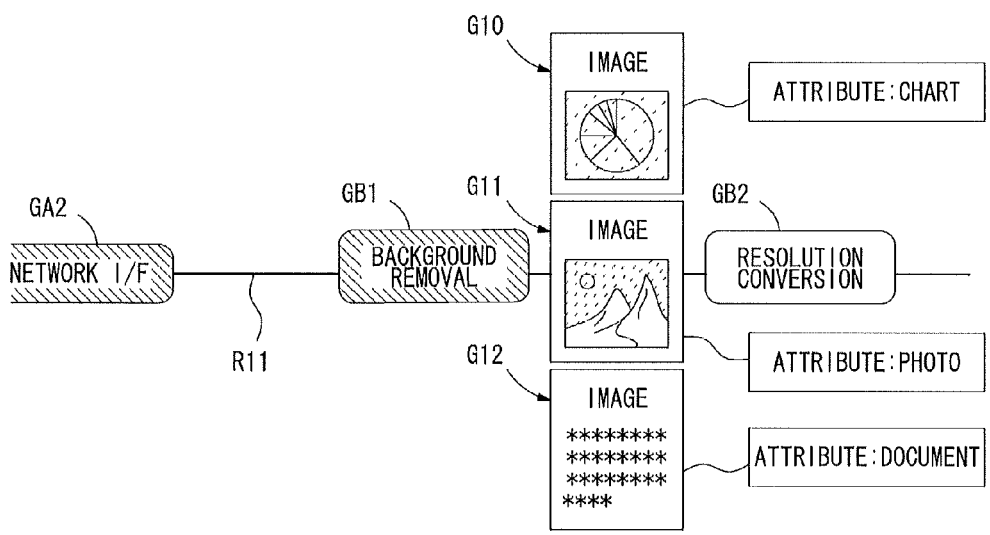

FIGS. 19A and 19B show the exemplary ways of displaying each of the multiple thumbnail images G10, G11 and G12 separately based on the corresponding image attribute when displaying the multiple thumbnail images G10, G11 and G12 at the same position in the processing path. FIGS. 19A and 19B show the exemplary ways of displaying different from the one shown in FIGS. 18A, 18B and 18C. When the network interface 41 obtains the image data of three pages, three thumbnail images G10, G11 and G12 are displayed on the lower side of the process block GA2 corresponding to the network interface 41 as illustrated in FIG. 19A. If the image attribute of the image data, to which each thumbnail image G10, G11 and G12 corresponds, is different from one another, these three thumbnail images G10, G11 and G12 are separately displayed without being laid on top of one another.

The image attribute is for distinguishing the types of the images such as charts, photos and documents. In the example of FIGS. 19A and 19B, the image attribute of the thumbnail image G10 is the "chart," the image attribute of the thumbnail image G11 is the "photo" and the image attribute of the thumbnail image G12 is the "document." When the image attribute differs, it is general to have the difference in the change in the image data in response to each image processing for each image attribute. In the example of FIG. 19A, the thumbnail images G10, G11 and G12 are separately displayed for each image attribute.

The thumbnail images G10, G11 and G12 are taken forward into the next stage to proceed the next image processing, and they are displayed on the lower side of the process block GB1 corresponding to the background removal 51 as illustrated in FIG. 19B. In this case, each of the thumbnail images G10, G11 and G12 corresponding to the image data actually processed through the background removal 51 is separately displayed for each image attribute. As a result, the user is allowed to easily see how the image data of each image attribute is changed before and after the background removal 51.

Figure 20:
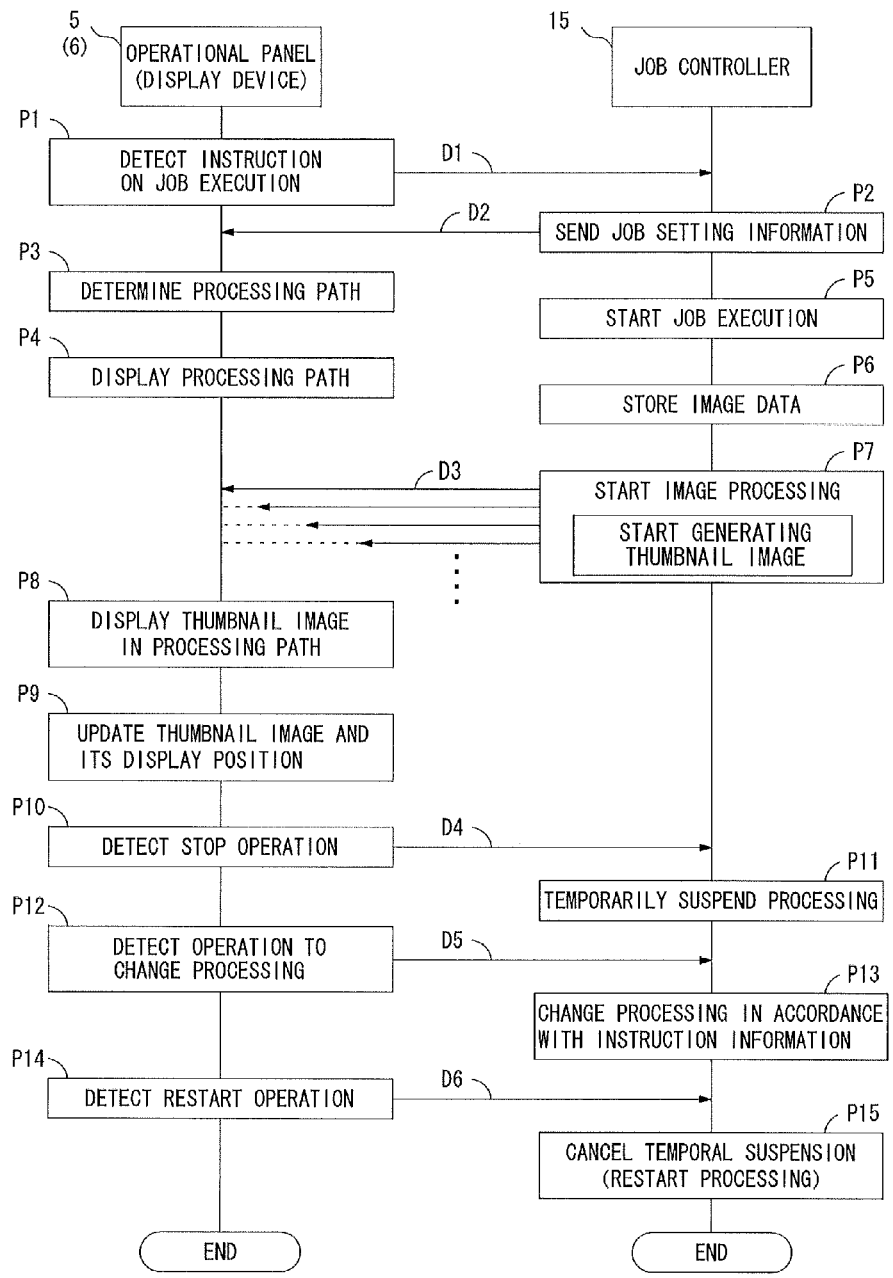
FIG. 20 is a flow diagram explaining an exemplary sequential procedure performed by the operational panel and a job controller in cooperation with each other when the job is executed on the image processing device.

FIG. 20 is a flow diagram explaining an exemplary sequential procedure performed by the operational panel 5 and the job controller 15 when the job is executed on the image processing device 1. In the example of FIG. 20, the user operates the operational panel 5 to give the instruction on execution of the job, and execution of the job is started. As detecting the user's instruction on execution of the job (process P1), the operational panel 5 sends operation information D1 instructing to start execution of the job to the job controller 15. After receiving the operation information D1, the job controller 15 sends setting information D2 of the job specifying the settings configured in advance by the user to the operational panel 5 (process P2). The setting information D2 contains information specifying the process detail of the processing performed by each of the image inputting unit 10, the image processing unit 12 and the image outputting unit 13 during execution of the job. The operational panel 5 obtains the setting information D2 of the job from the job controller 15, thereby determining the processing path of the processing performed during execution of the job (process P3), and displaying the processing path on the viewing area of the display unit 24 (process P4). At the same time, the job controller 15 starts execution of the job and inputs the image data to be the target of execution of the job (process P5). The job controller 15 then stores the input image data in the image memory 11 (process P6).

After storing the image data to be the target of execution of the job in the image memory 11, the job controller 15 brings the image processing unit 12 into operation to start the image processing on the image adjusting part 50, the image converting part 60 and the image correcting part 70 (process P7). The image processing unit 12 then brings the thumbnail image generating part 19 into operation to generate the thumbnail image one by one in conjunction with the image processing performed by the image adjusting part 50, the image converting part 60 and the image correcting part 70. The job controller 15 sends a generated thumbnail image D3 to the operational panel 5 every time the thumbnail image is generated by the thumbnail image generating part 19. The job controller 15 keeps controlling the operations of the image processing unit 12 and the image outputting unit 13 until receiving information especially operation information D4, D5 or D6 from the operational panel 5, and proceeds the series of operations performed during execution of the job.

In response to receiving the thumbnail image D3 from the job controller 15, the operational panel 5 displays the thumbnail image D3 in the processing path displayed on the viewing area of the display unit 24 (process P8). The operational panel 5 then repeatedly updates the thumbnail image and its display position with maintaining the predetermined period of time T or longer to display the thumbnail image (process P9). Thus, the user is allowed to know the progress of the image processing and to easily see how the image data is changed in response to each image processing. The progress of the image processing to be known by the user, however, is not always consistent with the actual progress of the job.

When detecting the stop operation by the user before totally completing execution of the job (process P10), the operational panel 5 sends the operation information D4 containing the stop signal to the job controller 15. As receiving the operation information D4 containing the stop signal, the job controller 15 temporarily suspends the processing in execution (process P11). While the processing is being temporarily suspended, the operational panel 5 may detect the user's operation to change the process detail of the image processing (process P12). The operational panel 5 generates the operation information D5 containing the instruction information based on the detected operation and sends the generated operation information D5 to the job controller 15. After receiving the operation information D5, the job controller 15 changes the image processing that should be carried out during execution of the job in accordance with the instruction information (process P13). In order to change the settings of the image processing that has already been complete, the job controller 15 discards the image data that has already been processed from the image memory 11 and changes the settings of the image processing in accordance with the instruction information. The job controller 15 then gives the instruction to the image processing unit 12 to start the image processing over again from the beginning with the original image data. In response to detecting the restart operation by the user (process P14), the operational panel 5 sends the operation information D6 containing the restart signal to the job controller 15. After receiving the operation information D6, the job controller 15 cancels the temporal suspension and restarts execution of each processing included in the series of operations (process P15).

Even when detecting the stop operation by the user made on the operational panel 5 after completing execution of the job, the operational panel 5 does not send the operation information D4 containing the stop signal to the job controller 15. When the user's operation to change the process detail of the image processing is detected by the operational panel 5 (process P12), the operational panel 5 generates the operation information D5 containing the instruction information based on the detected operation and sends the generated operation information D5 to the job controller 15 even after execution of the job. After receiving the operation information D5, the job controller 15 changes the image processing that should be carried out during execution of the job in accordance with the instruction information (process P13). The job controller 15 discards the image data that has already been processed from the image memory 11 and changes the settings of the image processing in accordance with the instruction information. The job controller 15 then gives the instruction to the image processing unit 12 to start the image processing over again from the beginning with the original image data. In response to detecting the restart operation by the user (process P14), the operational panel 5 generates the operation information D6 containing the restart signal to the job controller 15. After receiving the operation information D6, the job controller 15 cancels the temporal suspension and starts execution of the job which has already been executed over again from the beginning (process P15). The image data to be the target of execution of the job is not newly obtained, and the original image data already stored in the input image data storage part 11a of the image memory 11 is used for execution of the job.

Figure 21:
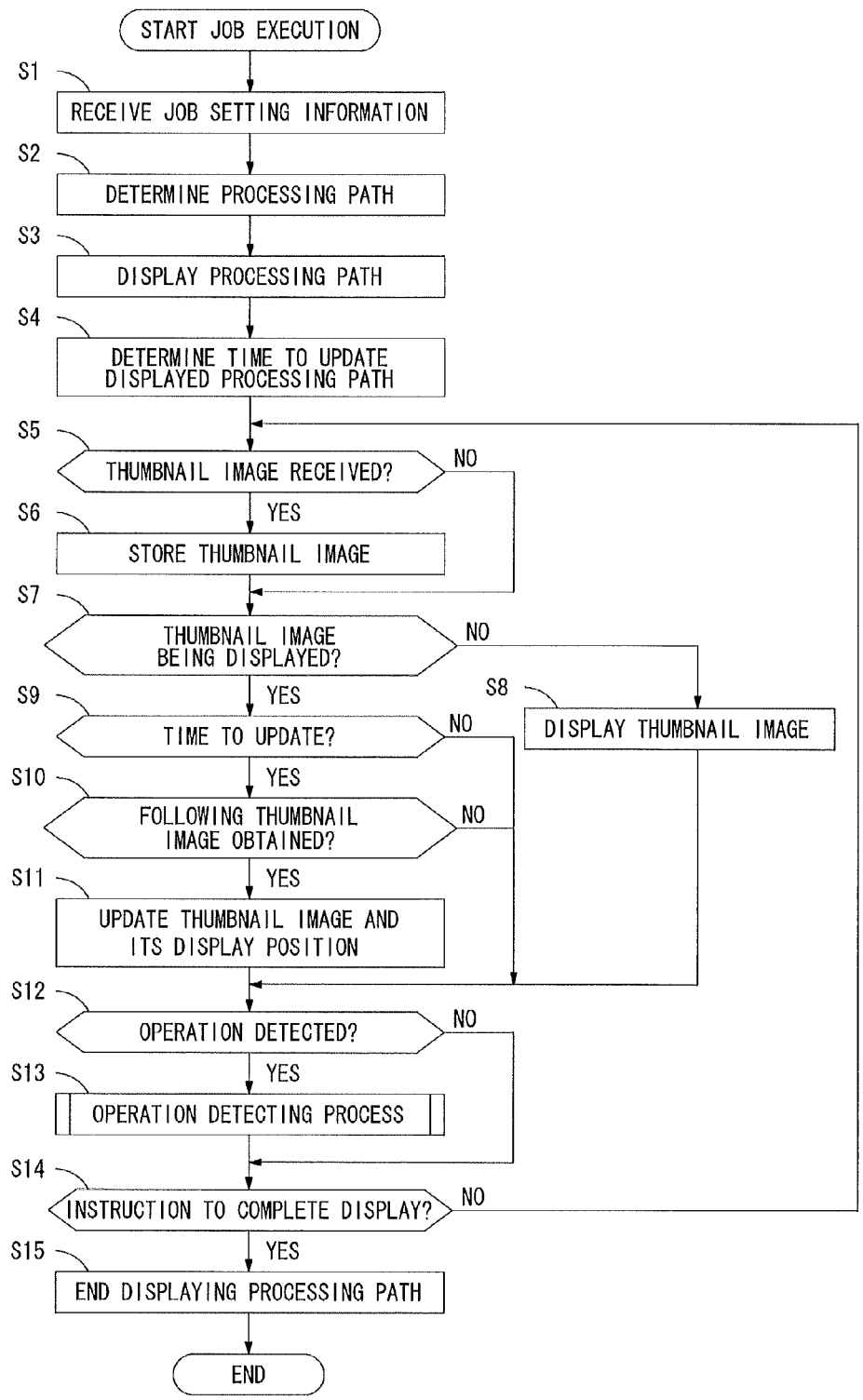
FIG. 21 is a flow diagram explaining an exemplary sequential procedure of the process performed on the operational panel.
Figure 22:
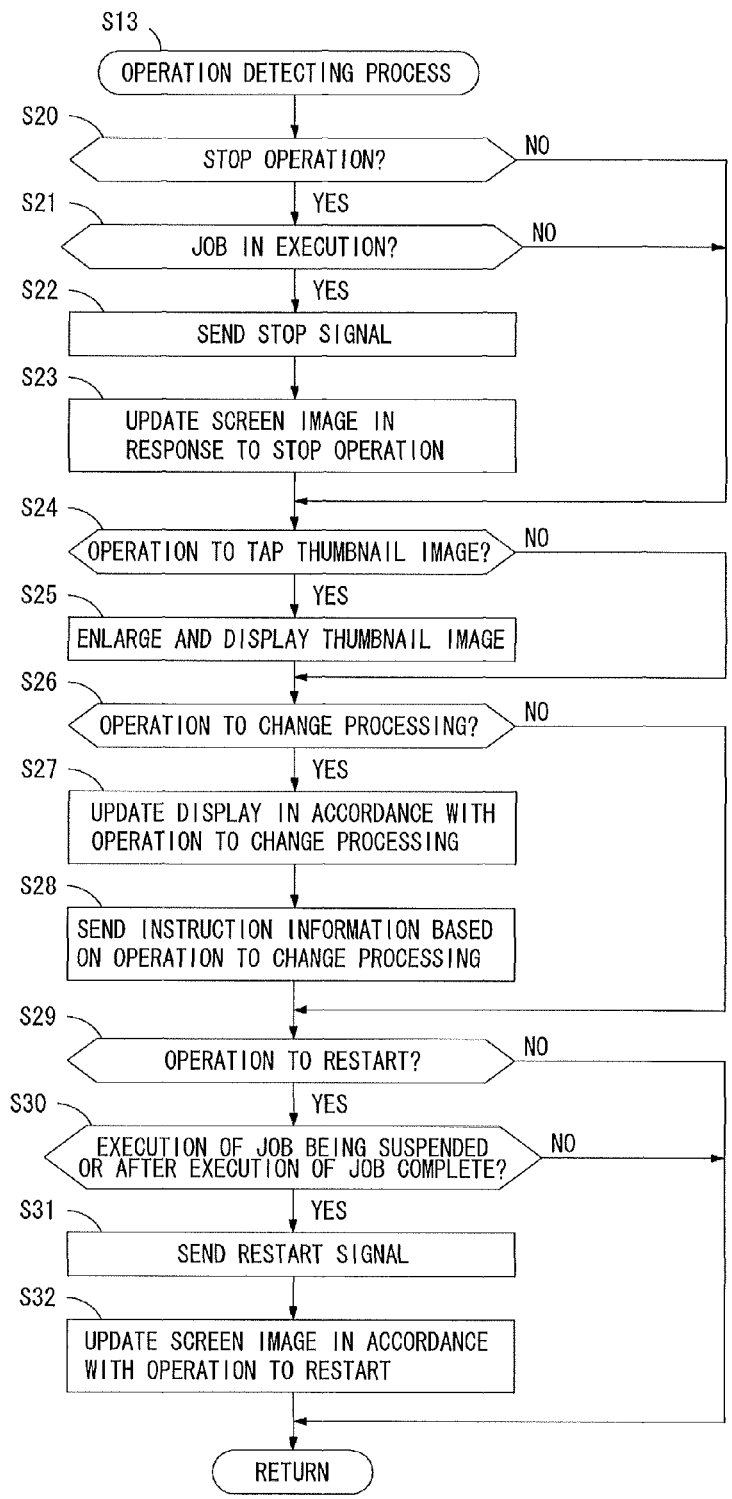
FIG. 22 is a flow diagram explaining the detailed exemplary sequential procedure of an operation detecting process.

The detailed sequential procedure on the operational panel 5 from the start to completion of execution of the job is described next. FIGS. 21 and 22 are flow diagrams explaining exemplary sequential procedures of the process performed on the operational panel 5. This process is performed upon execution of the aforementioned program 23 by the CPU 20 of the operational panel 5 in response to starting execution of the job.

As shown in FIG. 21, in response to starting the process, the operational panel 5 receives the setting information D2 of the job from the job controller 15 (step S1). As obtaining the setting information D2 of the job, the operational panel 5 determines the processing path of the image processing performed as the series of the operations during execution of the job (step S2), and displays the determined processing path on the viewing area of the display unit 24 (step S3). The operational panel 5 then determines the time to update the displayed processing path (step S4). The operational panel 5 sets at least the predetermined period of time T or longer as the update interval to allow the user to see how the image data is changed in response to each image processing.

Every time receiving the thumbnail image D3 from the job controller 15 (when a result of step S5 is YES), the operational panel 5 temporarily stores the thumbnail image D3 in a storage part such as the RAM 22 (step S6).

The operational panel 5 determines whether or not the thumbnail image is being displayed (step S7). When the thumbnail image is not being displayed, the operational panel 5 displays the thumbnail image at the initial position in the processing path only if the thumbnail image is stored in step S6 (step S8). When the thumbnail image is being displayed (when a result of step S7 is YES), the operational panel 5 determines if it is the time to update the displayed processing path (step S9). If it is the time to update the displayed processing path (when a result of step S9 is YES), the operational panel 5 updates the thumbnail image displayed in the processing path and the display position of the thumbnail image (step S11) only when the following thumbnail image has already been obtained (step S10).

After displaying the processing path on the viewing area of the display unit 24, the operational panel 5 may detect the user's operation (when a result of step S12 is YES). In this case, the operational panel 5 performs the operation detecting process (step S13). In this operation detecting process, execution of the job is temporarily suspended, the process detail of the series of the operations performed during execution of the job is changed, or execution of the job is restarted.

The operational panel 5 repeatedly performs the process in step S5 to S13 as described above until the user's instruction to complete the display is given (step S14). In response to receiving the user's instruction to complete the display (when a result of step S14 is YES), the operational panel 5 ends displaying the processing path on the viewing area of the display unit 24. The operational panel 5 returns the screen image displayed on the viewing area of the display unit 24 to the initial screen image before execution of the job (step S15).

FIG. 22 is a flow diagram explaining the detailed exemplary sequential procedure of the operation detecting process (step S13). Upon start of the process, the operational panel 5 determines whether or not the operation made by the user is the stop operation to temporarily suspend execution of the job (step S20). When the user's operation is the stop operation (when a result of step S20 is YES), the operational panel 5 further determines if the job is in execution (step S21). When the job is in execution, the operational panel 5 sends the stop signal to temporarily suspend execution of the job to the job controller 15 (step S22). When the user's operation is not the stop operation (when a result of step S20 is NO), the process in step S21 to 23 is not performed and skipped to step S24.

The operational panel 5 determines whether or not the user's operation is to tap the thumbnail image displayed in the processing path (step S24). When the user's operation is to tap the thumbnail image displayed in the processing path, the operational panel 5 enlarges the tapped thumbnail image to display (step S25). When the user's operation is not to tap the thumbnail image displayed in the processing path (when a result of step S24 is NO), the process in step S25 is not performed and skipped to step S26.

The operational panel 5 then determines whether or not the user's operation is to change the image processing (step S26). When the operation is to change the image processing (when a result of step S26 is YES), the operational panel 5 updates the image processing information or the process block displayed on the viewing area of the display unit 24 in accordance with the user's operation to change the processing (step S27). The operational panel 5 then sends the instruction information based on the user's operation to change the processing to the job controller 15 (step S28). When the user's operation is not to change the image processing (when a result of step S26 is NO), the process in step S27 and S28 is not performed and skipped to step S29.

The operational panel 5 determines whether or not the user's operation is to restart the job which is being temporarily suspended (step S29). When the operation is to restart the job (when a result of step S29 is YES), the operational panel 5 further determines if execution of the job is being temporarily suspended or execution of the job has already been complete (step S30). When execution of the job is being temporarily suspended or execution of the job has been complete, the operational panel 5 sends the restart signal to the job controller 15 (step S31). The operational panel 5 updates the screen image displayed on the viewing area of the display unit 24 to the one indicating that the job is in execution in accordance with the user's operation to restart the job (step S32). When the user's operation is not to restart the job (when a result of step S29 is NO), the process in step S30 to S32 is not performed. Although the operational panel 5 determines whether or not the user's operation is to restart the job in step S29, it may determine whether or not the user's operation is to give the instruction to start execution of the same job again after execution of the job is complete, for example.

The above-described process is performed by the operational panel 5 so that the user is allowed to check accurately how the image data changes in response to each image processing performed during execution of the job. When the user determines that the image processing of various types of the image processing during execution of the job is not performed as intended, he or she operates the operational panel 5, thereby making change in the settings of the image processing and redoing the image processing already performed. The user may operate the operational panel 5 during execution of the job or after completion of execution of the job. The user, therefore, is allowed to redo the image processing if necessary with checking the details of each image processing performed during execution of the job after giving the instruction on execution of the job, resulting in improvement in operability.

In order to redo the image processing after execution of the job is complete, the image data stored in the image memory 11 during execution of the job needs to be hold until at least the predetermined period of time elapses after execution of the job is complete, and the user's operation is made while the image data is hold.

The aforementioned program 23 may be installed on a portable terminal such as one of general tablet terminals as an application program, for example. With execution of the program 23 on the portable terminal, the portable terminal may be served as the portable display device 6 the same as the operational panel 5 as described above.

As described above, on the image processing device 1 of the present preferred embodiment, as the image processing unit 12 carries out the image processing to process the image data sequentially in accordance with the predetermined processing process, the thumbnail image generating part 19 generates the thumbnail image corresponding to the processed image data generated through each processing one by one. The display controlling part 32 of the operational panel 5 displays the processing path of various types of the image processing to process the image data performed sequentially by the image processing unit 12 during execution of the job and the thumbnail image generated by the thumbnail image generating part 19 on the viewing area of the display unit 24. The display controlling part 32 updates the displayed processing path to display the progress of the image processing to process the image data, and updates the thumbnail image displayed on the viewing area of the display unit 24 in conjunction with the update of the displayed processing path. The user is allowed to check accurately how the image data changes in response to each image processing performed during execution of the job. As a result, the user is allowed to easily find the image processing, the settings of which is to be changed, even when he or she tries to change the settings of the image processing performed during execution of the job, resulting in enhanced operability.

The image processing device 1 of the present preferred embodiment displays the process block corresponding to each of the various types of image processing performed sequentially by the image processing unit 12 in the processing path displayed on the viewing area of the display unit 24. Thus, the user is allowed to know the image data is processed by the image processing in accordance with what processing process.

As the operation to tap any of the process blocks is detected by the manipulation detecting part 33, the image processing device 1 of the present preferred embodiment displays the process detail of the image processing corresponding to the selected process block on the viewing area of the display unit 24. The user is allowed to know what processing is performed in each image processing during execution of the job in detail.

In response to starting execution of the job, on the image processing device 1 of the present preferred embodiment, the job controller 15 configures the processing path (process order) on the image processing unit 12 and configures the settings of each image processing performed by the image processing unit 12. The job controller 15 changes the processing path or the settings of the image processing corresponding to each process block on the image processing unit 12 based on the operation detected by the manipulation detecting part 33. The user, therefore, is allowed to change the settings of the image processing performed during execution of the job after execution of the job is started on the image processing device 1.

The image processing device 1 of the present preferred embodiment displays the thumbnail image generated by the thumbnail image generating part 19 in the processing path, and moves the thumbnail image along the processing path with updating the displayed thumbnail image. As a result, the progress of the image processing to process the image data is updated and displayed. The user sees the change in the thumbnail image moving along the processing path, thereby checking whether or not the image processing as intended is performed. This allows the user to easily check.

When the operation to tap the thumbnail image is detected by the manipulation detecting part 33, the image processing device 1 of the present preferred embodiment enlarges and displays the thumbnail image on the viewing area of the display unit 24. The user makes relatively easy operation to enlarge the thumbnail image when he or she would like to check the thumbnail image side by side, resulting in good operability.

In response to starting execution of the job, the image inputting unit 10 may obtain the image data of the multiple pages almost all at once. In such a case, in order to update the thumbnail image displayed on the viewing area of the display unit 24 in conjunction with the update of the displayed processing path, the image processing device 1 of the present preferred embodiment selects and displays the thumbnail image corresponding to the image data of the page about which the greatest change is brought before and after the image processing. The user, therefore, is allowed to check whether or not the image processing is carried out by viewing the thumbnail image corresponding to the image data of the page about which the greatest change is brought before and after the image processing.

In response to starting execution of the job, the image inputting unit 10 may obtain the image data of the multiple pages almost all at once. In such a case, in order to display the thumbnail image generated by the thumbnail image generating part 19 on the viewing area of the display unit 24, the image processing device 1 of the present preferred embodiment displays the multiple thumbnail images based on each image attribute. The user is allowed to check the multiple thumbnail images with different image attribute all at once, thereby making sure that the image processing as intended is carried out.

The image processing device 1 of the present preferred embodiment maintains at least the predetermined period of time T or longer as the update interval to update the progress of the image processing to process the image data in the processing path displayed on the viewing area of the display unit 24. Even when the image processing unit 12 completes all the image processing in a short time, the user is allowed to know accurately how the thumbnail image has changed in response to each image processing.

The image processing device 1 of the present preferred embodiment includes the user interface that allows the user to make the intuitive operation to change the process detail of the image data. This user interface provides a great operability especially when the user makes change in the process detail of the processing to process the image data performed during execution of the job.

As described above, the user is allowed to easily and accurately know how the image data changes in response to each image processing performed during execution of the job.

(Modifications)

While the preferred embodiment of the present invention has been described above, the present invention is not limited to the preferred embodiment. Various modifications may be applied to the present invention.

Figure 23:
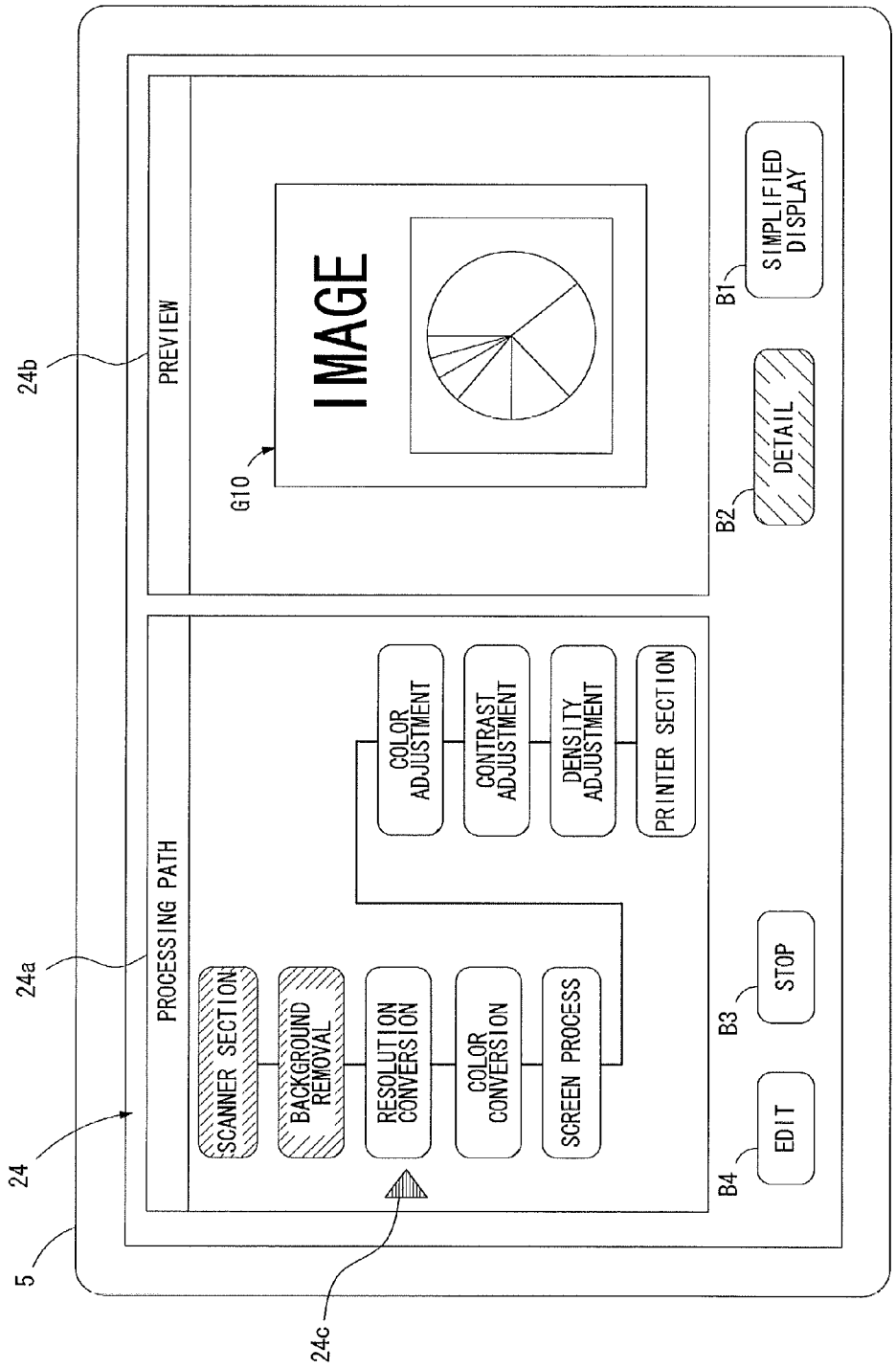
FIG. 23 is an example of a screen image to display a progress of the image processing in a different way.

According to the above-explained preferred embodiment, the thumbnail image generated by the thumbnail image generating part 19 is displayed in the processing path, and the thumbnail image moves along the processing path by being updated. However, this above-described way is not the only way to display the progress of the image processing. FIG. 23 is an example of the screen image to display the progress of the image processing in a different way from the one explained above. In the screen image illustrated in FIG. 23 separately includes a processing path display field 24a in which the processing path of the image data is displayed and a preview field 24b in which the thumbnail image G10 is displayed. The processed process blocks are displayed differently from the unprocessed process blocks, and the process block in execution is displayed with an indicator 24c in the processing path display field 24a. Thus, the user is allowed to know the progress of the image processing. In the preview field 24b, the thumbnail image G10 is displayed. The thumbnail image G10 displayed in the preview field 24b in relatively large size is updated to the thumbnail image which is generated based on the processed image data one by one as the image processing proceeds. With the preview field 24b, the user is allowed to see side by side of the thumbnail image G10 which is generated based on the processed image data in a normal size display without making it enlarge. The progress of the image processing may be displayed in the way explained with FIG. 23.

Each of the detailed configurations of the image inputting unit 10, the image processing unit 12 and the image outputting unit 13 is one of the examples. The configuration not described above may also be included in each of the image inputting unit 10, the image processing unit 12 and the image outputting unit 13.

What is claimed is:

1. An image processing device, comprising:
 a display part on which a variety of information is displayed;

a manipulation detecting part for detecting an operation on said display part;

an image inputting part for inputting image data;

a storage part for storing the image data input by said image inputting part;

an image processing part for reading the image data stored in said storage part and performing a plurality of image processing processes sequentially in accordance with a processing sequence set in advance;

a thumbnail image generating part for generating a thumbnail image one by one based on the image data input by said image inputting part or the processed image data generated sequentially in response to each process of the image processing performed by said image processing part;

an image outputting part for outputting an image based on the image data which is processed at each process of the image processing by said image processing part; and a display controlling part for displaying the processing sequence of the image processing performed sequentially by said image processing part from the image data input by said image inputting part until the image is output by said image outputting part on said display part, and for displaying the thumbnail images generated by said thumbnail image generating part on said display part, wherein said display controlling part updates said displayed processing sequence, thereby displaying a progress of the image processing to process the image data, and updates the thumbnail image displayed on said display part in conjunction with the update of said displayed processing sequence.

2. The image processing device according to claim 1, wherein
said display controlling part displays a process block corresponding to each of the processes of the image processing performed sequentially by said image processing part in said processing sequence.

3. The image processing device according to claim 2, wherein
said display controlling part, when the operation to select one of the at least one process block is detected by said manipulation detecting part, displays a process detail of the image processing corresponding to the selected process block on said display part.

4. The image processing device according to claim 2, further comprising:
a job controlling part for setting the processing process in accordance with which the image processing is performed by said image processing part, and for setting each type of the image processing performed by said image processing part, wherein
said job controlling part makes change in the processing process in accordance with which the image processing is performed by said image processing part or the settings of the image processing corresponding to each process block based on the operation detected by said manipulation detecting part.

5. The image processing device according to claim 1, wherein
said display controlling part displays the thumbnail images generated by said thumbnail image generating part in said processing sequence and moves the thumbnail image along said processing sequence, thereby updating the progress of the image processing to process the image data.

6. The image processing device according to claim 5, wherein
said display controlling part, when the operation to tap the thumbnail image is detected by said manipulation detecting part, enlarges the thumbnail image displayed on said display part.

7. The image processing device according to claim 1, wherein
said display controlling part, when the image data of multiple pages is input by said image inputting part, selects and displays the thumbnail image corresponding to the image data of the page about which a greatest change is brought before and after the image processing to update the thumbnail image displayed on said display part in conjunction with the update of said displayed processing sequence.

8. The image processing device according to claim 1, wherein
said display controlling part, when the image data of the multiple pages with different image attributes is input by said image inputting part, displays the multiple thumbnail images based on the corresponding image attribute to display the thumbnail image generated by the thumbnail image generating part.

9. The image processing device according to claim 1, wherein
said display controlling part maintains at least a predetermined period of time or longer as an update interval to update the progress of the image processing to process the image data displayed in the processing path on said display part.

10. A display device capable of displaying in cooperation with an image processing device capable of performing a variety of image processing to process image data, wherein
said image processing device includes:
an image inputting part for inputting the image data;
a storage part for storing the image data input by said image inputting part;
an image processing part for reading the image data stored in said storage part and performing a plurality of image processing processes sequentially in accordance with a processing sequence set in advance;
a thumbnail image generating part for generating a thumbnail image one by one based on the image data input by said image inputting part or the processed image data generated sequentially in response to each process of the image processing performed by said image processing part;
an image outputting part for outputting an image based on the image data which is processed at each process of the image processing by said image processing part; and
a job controlling part for controlling the image processing performed by said image processing part and the processing to output the image performed by said image outputting part,
said display device includes:
a communication part for establishing communication with said image processing device;
a display part on which a variety of information is displayed;
a manipulation detecting part for detecting an operation on said display part; and
a display controlling part for displaying the processing sequence of the image processing performed sequentially by said image processing part from the image data input by said image inputting part until the image is output by said image outputting part on said display part in accordance with information obtained from said job controlling part, and for obtaining the thumbnail images generated one by one by said thumbnail image generating part and displaying the obtained thumbnail images on said display part, and said display controlling part updates said displayed processing path, thereby displaying a progress of the image processing to process the image data, and updates the thumbnail image displayed on said display part in conjunction with the update of said displayed processing sequence.

11. The display device according to claim 10, wherein said display controlling part displays a process block corresponding to each of various types of the image processing performed sequentially by said image processing part in said processing sequence.

12. The display device according to claim 11, wherein said display controlling part, when the operation to select one of the at least one process block is detected by said manipulation detecting part, displays a process detail of the image processing corresponding to the selected process block on said display part.

13. The display device according to claim 11, wherein said manipulation detecting part, in response to detecting the operation to make change in the processing process in accordance with which the image processing is performed by said image processing part or the settings of the image processing corresponding to each process block, outputs operation information based on the detected operation to said job controlling part via said communication part.

14. The display device according to claim 10, wherein said display controlling part displays the thumbnail images generated by said thumbnail image generating part in said processing path and moves the thumbnail images along said processing sequence, thereby updating the progress of the image processing to process the image data.

15. The display device according to claim 14, wherein said display controlling part, when the operation to tap the thumbnail image is detected by said manipulation detecting part, enlarges the thumbnail image displayed on said display part.

16. The display device according to claim 10, wherein said display controlling part, when the image data of multiple pages is input by said image inputting part, selects and displays the thumbnail image corresponding to the image data of the page about which a greatest change is brought before and after the image processing to update the thumbnail image displayed on said display part in conjunction with the update of said displayed processing sequence.

17. The display device according to claim 10, wherein said display controlling part, when the image data of the multiple pages with different image attributes is input by said image inputting part, displays the multiple thumbnail images based on the corresponding image attribute to display the thumbnail image generated by the thumbnail image generating part.

18. The display device according to claim 10, wherein said display controlling part maintains at least a predetermined period of time or longer as an update interval to update the progress of the image processing to process the image data displayed in the processing sequence on said display part.

19. A non-transitory computer readable recording medium on which a program is recorded, said program executable on a display device including a display part on which a variety of information is displayed and capable of detecting an operation on said display part, said program being executed on said display device, thereby causing said display device to display in cooperation with an image processing device capable of performing a variety of image processing to process image data, wherein said image processing device includes:
an image inputting part for inputting the image data;
a storage part for storing the image data input by said image inputting part;
an image processing part for reading the image data stored in said storage part and performing a plurality of image processing processes sequentially in accordance with a processing sequence set in advance;
a thumbnail image generating part for generating a thumbnail image one by one based on the image data input by said image inputting part or the processed image data generated sequentially in response to each process of the image processing performed by said image processing part;
an image outputting part for outputting an image based on the image data which is processed at each process of the image processing by said image processing part; and
a job controlling part for controlling the image processing performed by said image processing part and the processing to output the image performed by said image outputting part, said program executed on said display device to function as a system comprises:
a communication part for establishing communication with said image processing device; and
a display controlling part for displaying a processing path of various types of the image processing performed sequentially by said image processing part from the image data is input by said image inputting part until the image is output by said image outputting part on said display part in accordance with information obtained from said job controlling part, and for obtaining the thumbnail image generated one by one by said thumbnail image generating part and displaying the obtained thumbnail image on said display part, and
a display controlling part for displaying the processing sequence of the image processing performed sequentially by said image processing part from the image data input by said image inputting part until the image is output by said image outputting part on said display part in accordance with information obtained from said job controlling part, and for obtaining the thumbnail images generated one by one by said thumbnail image generating part and displaying the obtained thumbnail images on said display part, and
said display controlling part updates said displayed processing path, thereby displaying a progress of the image processing to process the image data, and updates the thumbnail image displayed on said display part in conjunction with the update of said displayed processing sequence.

* * * * *